(12) United States Patent
Khoshnevisan et al.

(10) Patent No.: US 12,457,603 B2
(45) Date of Patent: Oct. 28, 2025

(54) CONFIGURATIONS AND SWITCHING BETWEEN DIFFERENT MODES OF SDM PUSCH

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/810,273

(22) Filed: Jun. 30, 2022

(65) Prior Publication Data
US 2024/0008033 A1   Jan. 4, 2024

(51) Int. Cl.
*H04W 72/1268* (2023.01)
*H04L 1/00* (2006.01)
*H04L 1/08* (2006.01)
*H04W 72/23* (2023.01)

(52) U.S. Cl.
CPC ....... *H04W 72/1268* (2013.01); *H04L 1/0003* (2013.01); *H04L 1/08* (2013.01); *H04W 72/23* (2023.01)

(58) Field of Classification Search
CPC ............ H04W 72/1268; H04W 72/23; H04W 72/232; H04L 1/0003; H04B 7/0408; H04B 7/0695; H04B 7/0697
See application file for complete search history.

(56) References Cited

U.S. PATENT DOCUMENTS

| | | | |
|---|---|---|---|
| 11,632,155 B2 * | 4/2023 | Park | H04B 7/0404 370/329 |
| 2013/0208705 A1 | 8/2013 | Ko et al. | |
| 2020/0083939 A1 * | 3/2020 | Park | H04L 5/0007 |
| 2020/0367217 A1 * | 11/2020 | Wang | H04L 5/0094 |

(Continued)

FOREIGN PATENT DOCUMENTS

WO    2021184296 A1    9/2021

OTHER PUBLICATIONS

International Search Report and Written Opinion—PCT/US2023/026018—ISA/EPO—Sep. 28, 2023.

(Continued)

*Primary Examiner* — Redentor Pasia
(74) *Attorney, Agent, or Firm* — Paul M. McAdams; Procopio, Cory, Hargreaves & Savitch LLP

(57) ABSTRACT

Apparatus, methods, and computer program products for transmitting SDM PUSCH are provided. An example method may include receiving, from a second network entity, downlink control information (DCI) scheduling a physical uplink shared channel (PUSCH) transmission, where the PUSCH transmission includes a first portion associated with a first subset of layers within a set of layers and a second portion associated with a second subset of layers within the set of layers. The example method may further include mapping at least one transport block (TB) or codeword (CW) to the first portion or the second portion based on the DCI or a radio resource control (RRC) configuration. The example method may further include transmitting the at least one TB or CW to the second network entity.

30 Claims, 16 Drawing Sheets

(56) References Cited

U.S. PATENT DOCUMENTS

| | | | | |
|---|---|---|---|---|
| 2021/0337534 | A1* | 10/2021 | Xiong | H04L 1/08 |
| 2021/0359808 | A1* | 11/2021 | Takeda | H04L 5/0023 |
| 2022/0038158 | A1 | 2/2022 | Liu et al. | |
| 2023/0053727 | A1* | 2/2023 | Huang | H04W 72/23 |
| 2023/0076139 | A1* | 3/2023 | Muruganathan | H04L 5/0048 |
| 2023/0094010 | A1* | 3/2023 | Zhang | H04B 7/0639 |
| | | | | 370/329 |
| 2023/0179281 | A1* | 6/2023 | Svedman | H04L 5/0094 |
| | | | | 455/101 |
| 2023/0217456 | A1* | 7/2023 | Yi | H04L 5/0094 |
| | | | | 370/329 |
| 2023/0262692 | A1* | 8/2023 | Lin | H04W 72/566 |
| | | | | 370/329 |
| 2023/0353317 | A1* | 11/2023 | Cirik | H04L 5/0051 |
| 2024/0056227 | A1* | 2/2024 | Wang | H04W 74/002 |
| 2024/0137184 | A1* | 4/2024 | Noh | H04L 5/0057 |
| 2024/0155606 | A1* | 5/2024 | Wang | H04B 7/0456 |

OTHER PUBLICATIONS

Qualcomm Incorporated: "Simultaneous Multi-Panel Transmission", R1-2205019, 3GPP TSG-RAN WG1 Meeting #109-e, 3rd Generation Partnership Project, Mobile Competence Centre, 650, Route Des Lucioles, F-06921 Sophia-Antipolis Cedex, France, vol. RAN WG1, No. E-Meeting, May 9, 2022-May 20, 2022, Apr. 29, 2022, XP052203881, 10 pages Section 2, Proposal 2, p. 2, figure 1.

* cited by examiner

CONFIGURATIONS AND SWITCHING BETWEEN DIFFERENT MODES OF SDM PUSCH

TECHNICAL FIELD

The present disclosure relates generally to communication systems, and more particularly, to wireless communication systems with spatial division multiplexing (SDM) physical uplink shared channel (PUSCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first network entity, such as a user equipment (UE), are provided. The apparatus may include a memory and at least one processor coupled to the memory. The memory and the at least one processor coupled to the memory may be configured to receive, from a second network entity, downlink control information (DCI) scheduling a physical uplink shared channel (PUSCH) transmission, where the PUSCH transmission includes a first portion associated with a first subset of layers within a set of layers and a second portion associated with a second subset of layers within the set of layers. The memory and the at least one processor coupled to the memory may be further configured to map at least one transport block (TB) or codeword (CW) to the first portion or the second portion based on the DCI or a radio resource control (RRC) configuration. The memory and the at least one processor coupled to the memory may be further configured to transmit the at least one TB or CW to the second network entity.

In another aspect of the disclosure, a method, a computer-readable medium, and an apparatus at a first network entity, such as a base station, are provided. The apparatus may include a memory and at least one processor coupled to the memory. The memory and the at least one processor coupled to the memory may be configured to transmit, to a second network entity, DCI scheduling a PUSCH transmission including a first portion and a second portion, where the PUSCH transmission includes a first portion associated with a first subset of layers within a set of layers and a second portion associated with a second subset of layers within the set of layers. The memory and the at least one processor coupled to the memory may be further configured to receive at least one TB or CW from the second network entity, where the at least one TB or CW is mapped to the first portion or the second portion based on the DCI or an RRC configuration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
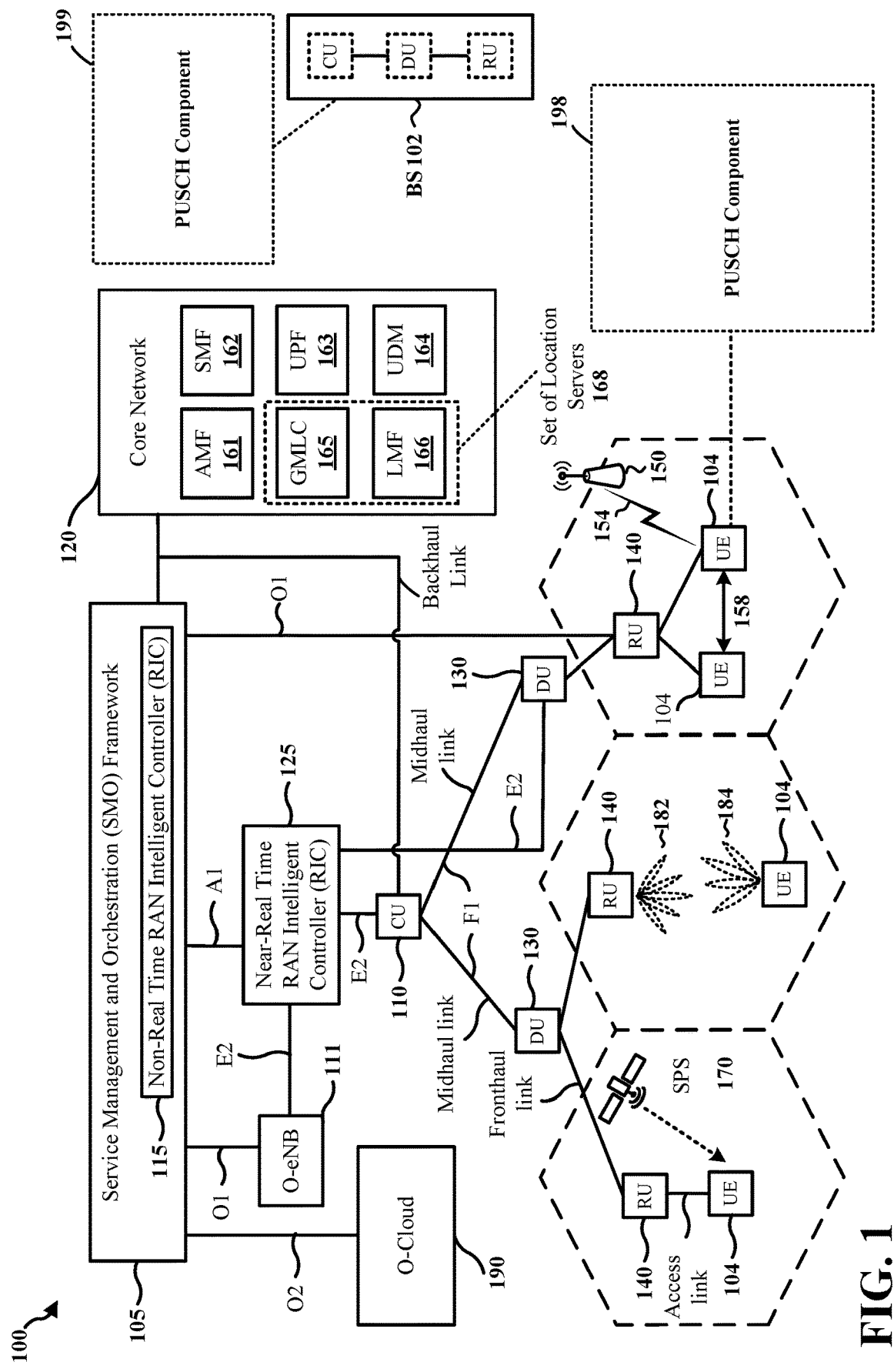
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a PUSCH component 198. In some aspects, the PUSCH component 198 may be configured to receive, from a second network entity, DCI scheduling a PUSCH transmission, where the PUSCH transmission includes a first portion associated with a first subset of layers within a set of layers and a second portion associated with a second subset of layers within the set of layers. In some aspects, the PUSCH component 198 may be further configured to map at least one TB or CW to the first portion or the second portion based on the DCI or an RRC configuration. In some aspects, the PUSCH component 198 may be further configured to transmit the at least one TB or CW to the second network entity.

In certain aspects, the base station 102 may include a PUSCH component 199. In some aspects, the PUSCH component 199 may be configured to transmit, to a second network entity, DCI scheduling a PUSCH transmission including a first portion and a second portion, where the PUSCH transmission includes a first portion associated with a first subset of layers within a set of layers and a second portion associated with a second subset of layers within the set of layers. In some aspects, the PUSCH component 199 may be further configured to receive at least one TB or CW from the second network entity, where the at least one TB or CW may be mapped to the first portion or the second portion based on the DCI or an RRC configuration.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
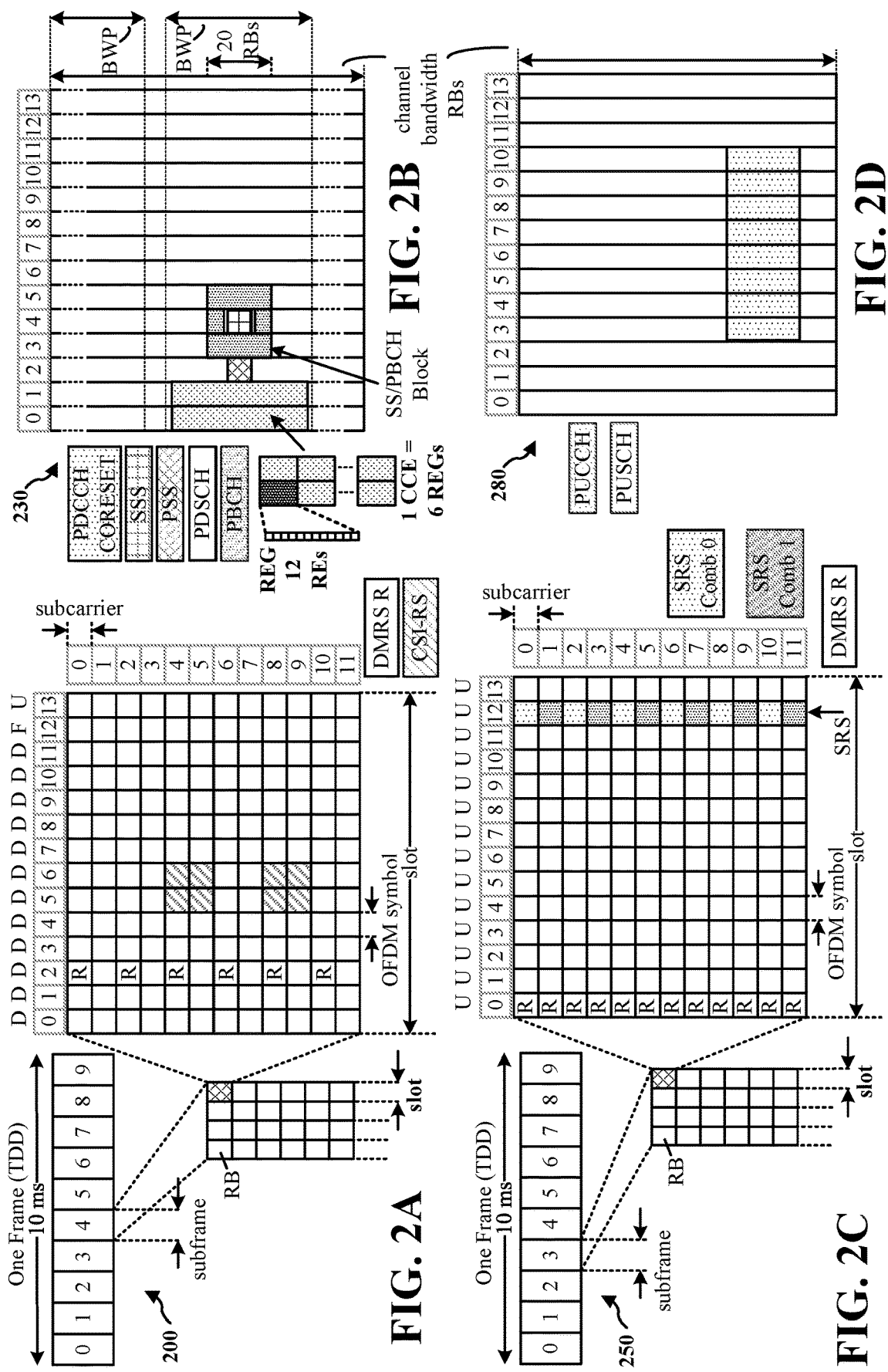
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| $\mu$ | SCS $\Delta f = 2^{\mu} \cdot 15[\text{KHz}]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*$kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
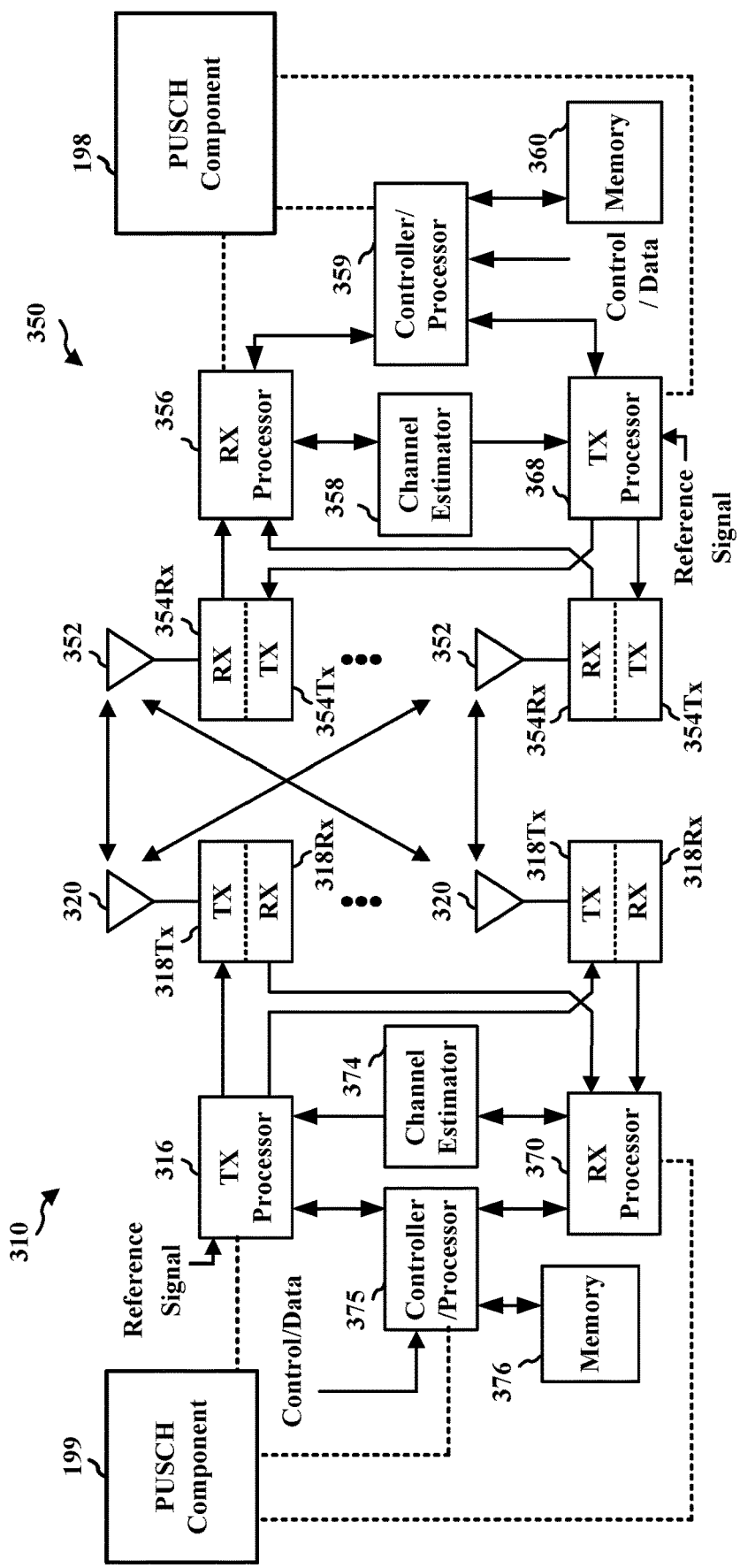
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with PUSCH component 198 of FIG. 1.

At least one of the TX processor 316, the RX processor 370, and the controller/processor 375 may be configured to perform aspects in connection with PUSCH component 199 of FIG. 1.

Figure 4:
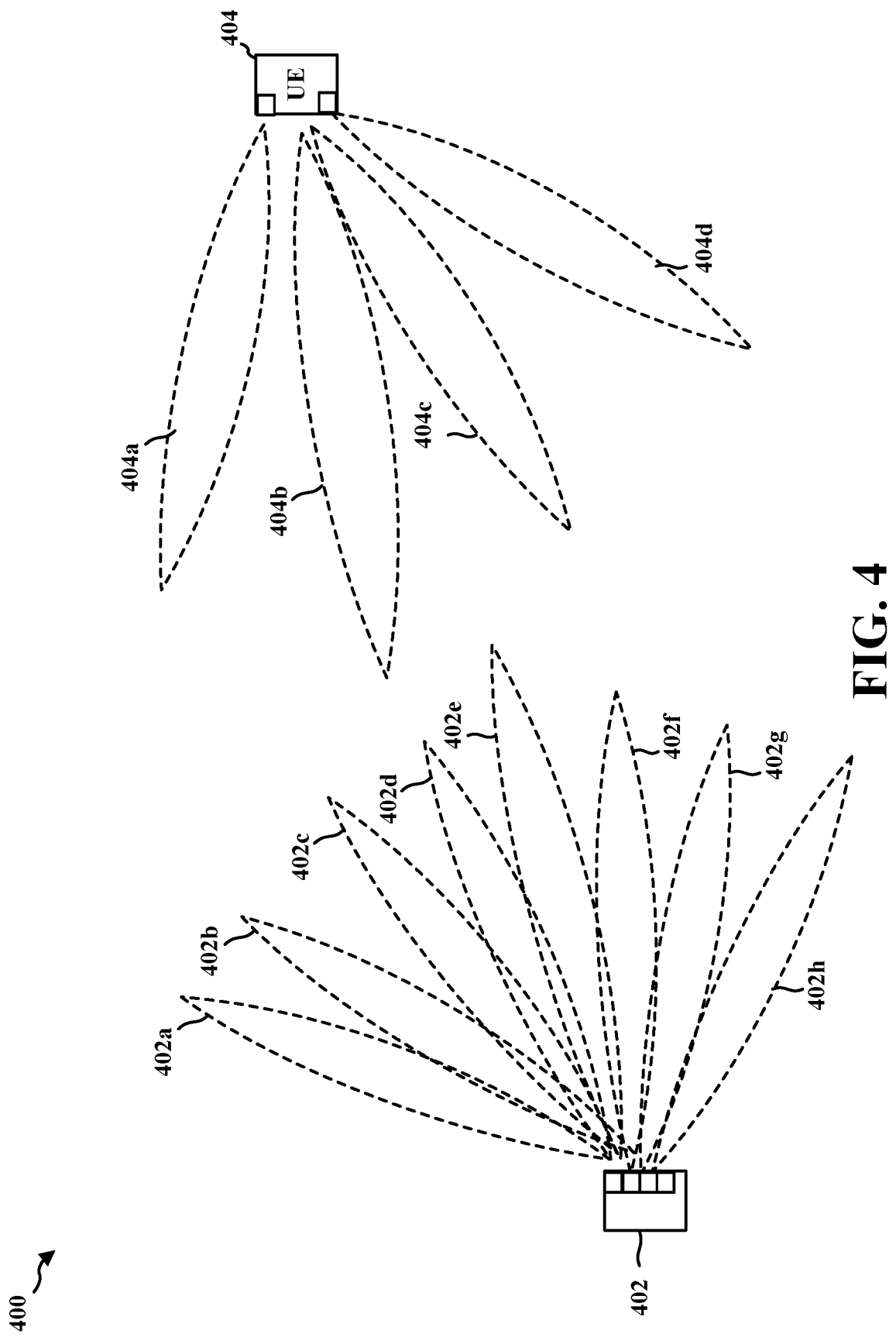
FIG. 4 is a diagram illustrating an example of a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 402a-402h. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication.

The base station 402 and the UE 404 may each include multiple transmission reception points (TRPs). Each TRP may include different RF modules having a shared hardware and/or software controller. Each TRP may perform separate baseband processing. Each TRP may include a different antenna panel or a different set of antenna elements.

A set of time and frequency resources that may be used for one or more transmissions of SRS may be referred to as an "SRS resource set." In some communication systems, the SRS resource set applicability for an SRS resource set may be configured by a higher layer parameter, such as "usage" associated with the SRS resource set, such as in the SRS-ResourceSet parameter. For example, usage may be configured as one of beam management, codebook, non-codebook, antenna switching, or the like. Each SRS resource set may be configured with one or more (such as up to 16) SRS resources. Each SRS resource set may be aperiodic, semi-persistent, or periodic.

In some wireless communication systems, two types of PUSCH transmissions may be supported. The first type may be referred to as codebook based transmission. For codebook based transmission, a UE may be configured with one SRS resource set with "usage" set to "codebook." For example, a maximum of 4 SRS resources within the set may be configured for the UE. Each SRS resource may be radio resource control (RRC) configured with a number of ports, such as one or more ports. The SRS resource indicator (SRI) field in the UL DCI scheduling the PUSCH may indicate one SRS resource. The number of ports configured for the indicated SRS resource may determine number of antenna ports for the PUSCH. The PUSCH may be transmitted with the same spatial domain filter (which may be otherwise referred to as a "beam") as the indicated SRS resources. The number of layers (i.e., rank) or transmitted precoding matrix indicator (TPMI) (e.g., for precoder) for the scheduled PUSCH may be determined from a separate DCI field "Precoding information and number of layers."

For non-codebook-based transmission, a UE may be configured with one SRS resource set with "usage" set to "non-codebook." For example, a maximum of 4 SRS resources within the set may be configured for the UE. Each SRS resource may be RRC configured with one port. The SRI field in the UL DCI scheduling the PUSCH may indicate one or more SRS resources. A number of indicated SRS resources may determine the rank (i.e., number of layers) for the scheduled PUSCH. The PUSCH may be transmitted with the same precoder as well as a same spatial domain filter (i.e., beam) as the indicated SRS resources.

In some aspects, multi-TRP or multi-panel may be used for enhancing reliability and robustness for PUSCH. For example, if one link using a first TRP is blocked and one repetition of the PUSCH fails to be received, another repetition may be received and decoded by another TRP. Therefore, with multi-TRP, diversity of transmission is increased and the PUSCH transmission may be more reliable. A repetition may be otherwise referred to as a transmission occasion.

A PUSCH transmission may be transmitted in one or more repetitions (which may also be referred to as "portion" herein) using different types of repetition. For different PUSCH repetitions corresponding to the same TB, the repetitions are transmitted in different slots in type A repetition while the repetitions are transmitted in different mini-slots in type B repetition. The number of repetitions may be RRC configured or may be indicated dynamically, such as by utilizing a time-domain resource assignment (TDRA) field of DCI. In some wireless communication systems, all the repetitions may be transmitted with the same beam. For example, the SRI field of the DCI may be applied to all the repetitions. SRI may be a field in the UL DCI that determines the beam or power control parameters for PUSCH by pointing to one or more SRS resources within an SRS resource set.

In some other wireless communication systems, different PUSCH repetitions are intended to be received at different TRPs, panels, or antennas at the base station and the repetitions may use the same beam or different beams. For example, two sets of repetitions that each include its own beam associated with its own power control parameters may be provided. Each set of repetitions may include one or more repetitions. Such two sets of repetitions may correspond with two SRS resource sets which may include DCI that may indicate two beams and two sets of power control parameters by indicating one or more SRS resources within each of the two SRS resource sets. Aspects herein enable association between the two SRS resource sets and the two set of PUSCH repetitions.

Figure 5:
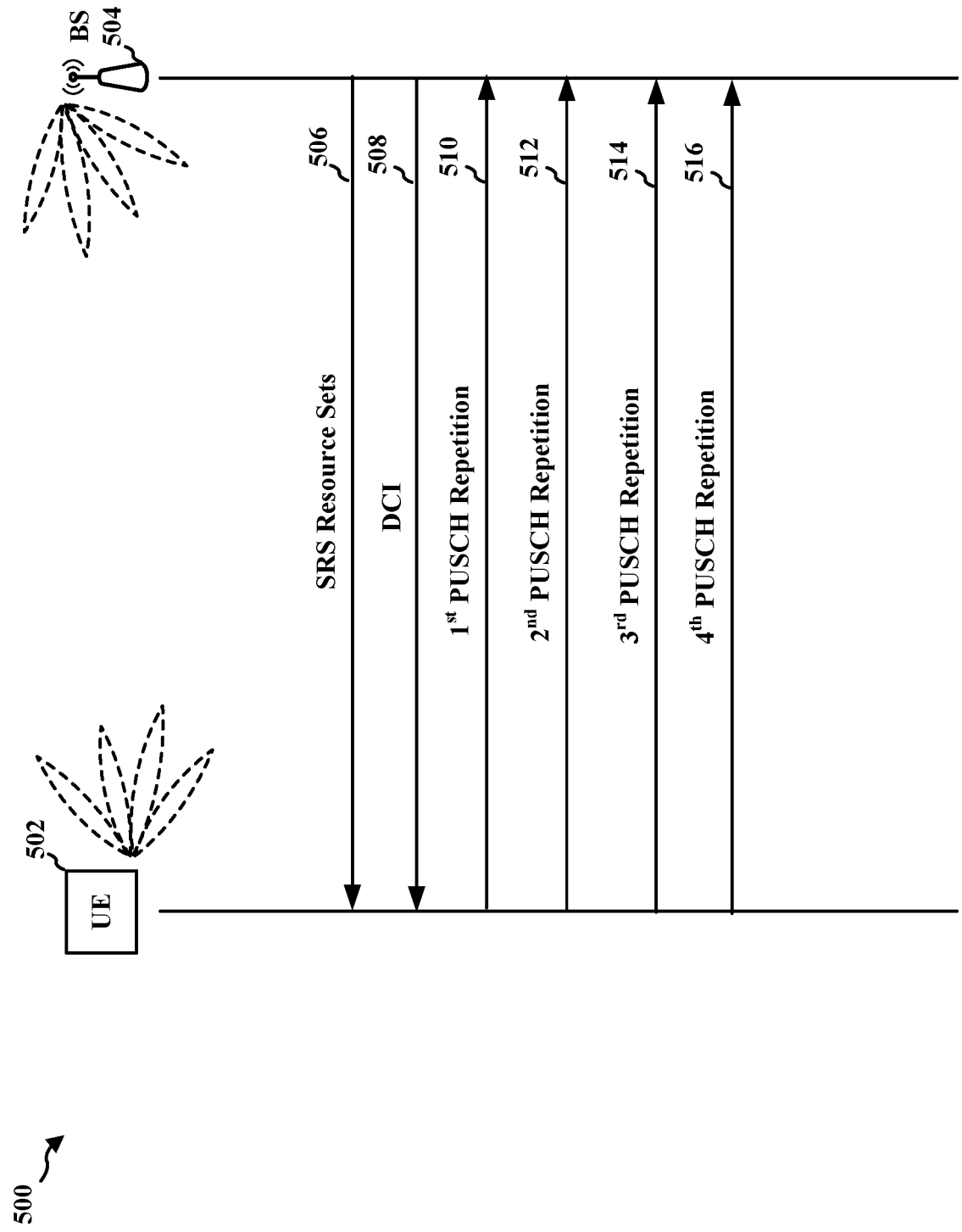
FIG. 5 is a diagram illustrating example communications between a UE and a network entity.

FIG. 5 is a diagram 500 illustrating communications between a UE 502 and a network entity 504 (e.g., a base station). As illustrated in FIG. 5, the network entity 504 may configure the UE 502 with at least two SRS resource sets 506. In some aspects, the network entity 504 may not support dynamic order switching. In some aspects, the SRS resource sets 506 may include an SRS resource set identifier (ID), which may be represented by an srs-ResourceSetID field in an SRS-ResourceSet parameter. In some aspects, the SRS resource sets 506 may include a parameter that represents an order, such as an SRS-ResourceSetOrder parameter. The network entity 504 may be a network node. A network node may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

In some aspects, the network entity 504 may transmit a DCI 508 to the UE 502. In some aspects, dynamic order switching may be supported by the network entity 504. In some aspects, the DCI 508 may include one or more bits, such as two bits, to indicate an order for the SRS resource sets in the SRS resource sets 506.

The UE 502 may transmit one or more repetitions of a PUSCH, such as a first PUSCH repetition 510, a second PUSCH repetition 512, a third PUSCH repetition 514, and a fourth PUSCH repetition 516, to the network entity 504. In some aspects, within two SRS resource sets in the SRS resource sets 506, the SRS resource set with the lowest ID may correspond with the first set of repetitions (first may be the one that appears first in time) and the SRS resource set with the second lowest ID corresponds to the second set of repetitions. For example, a first set of PUSCH repetitions may include the first PUSCH repetition 510 and the second PUSCH repetition 512 while the second set of PUSCH repetitions may include the third PUSCH repetition 514 and the fourth PUSCH repetition 516. The first set of PUSCH repetitions may correspond with the SRS resource set with the lowest ID.

In some aspects, within two SRS resource sets in the SRS resource sets 506, the SRS resource set with the highest ID may correspond with the first set of repetitions and the SRS resource set with the second highest ID corresponds to the second set of repetitions. For example, a first set of PUSCH repetitions may include the first PUSCH repetition 510 and the second PUSCH repetition 512 while the second set of PUSCH repetitions may include the third PUSCH repetition 514 and the fourth PUSCH repetition 516. The first set of PUSCH repetitions may correspond with the SRS resource set with the highest ID. In some aspects, the SRS resource set associated with the first PUSCH repetition 510, the second PUSCH repetition 512, the third PUSCH repetition 514, and the fourth PUSCH repetition 516, may be determined based on the parameter that represents an order.

In some aspects, if dynamic order switching is supported by the network entity 504 and the DCI 508 include one or more bits that represent an order, the one or more bits may represent a DCI code point that may correspond with an order. For example, a DCI code point may be 0, 1, 2, or 3 and may be associated with an order 1, 2, 12, and 21. Table 2 illustrates an example correspondence between a set of DCI codepoints and a corresponding set of relationships that indicate an order of PUSCH transmission.

TABLE 2

| Code-point | SRS resource set(s) | SRI (for both CB and NCB)/TPMI (CB) field(s) |
|---|---|---|
| 0 | s-TRP mode with $1^{st}$ SRS resource set (TRP1) | $1^{st}$ SRI/TPMI field ($2^{nd}$ field is unused) |
| 1 | s-TRP mode with $2^{nd}$ SRS resource set (TRP2) | $1^{st}$ SRI/TPMI field ($2^{nd}$ field is unused) |
| 2 | m-TRP mode with (TRP1, TRP2 order) $1^{st}$ SRI/TPMI field: $1^{st}$ SRS resource set $2^{nd}$ SRI/TPMI field: $2^{nd}$ SRS resource set | Both $1^{st}$ and $2^{nd}$ SRI/TPMI fields |
| 3 | m-TRP mode with (TRP2, TRP1 order) $1^{st}$ SRI/TPMI field: $1^{st}$ SRS resource set $2^{nd}$ SRI/TPMI field: $2^{nd}$ SRS resource set | Both $1^{st}$ and $2^{nd}$ SRI/TPMI fields |

As illustrated in Table 2, the SRS resource set indicator may be based on whether 2 SRS resource sets are configured corresponding to that DCI format.

Figure 6:
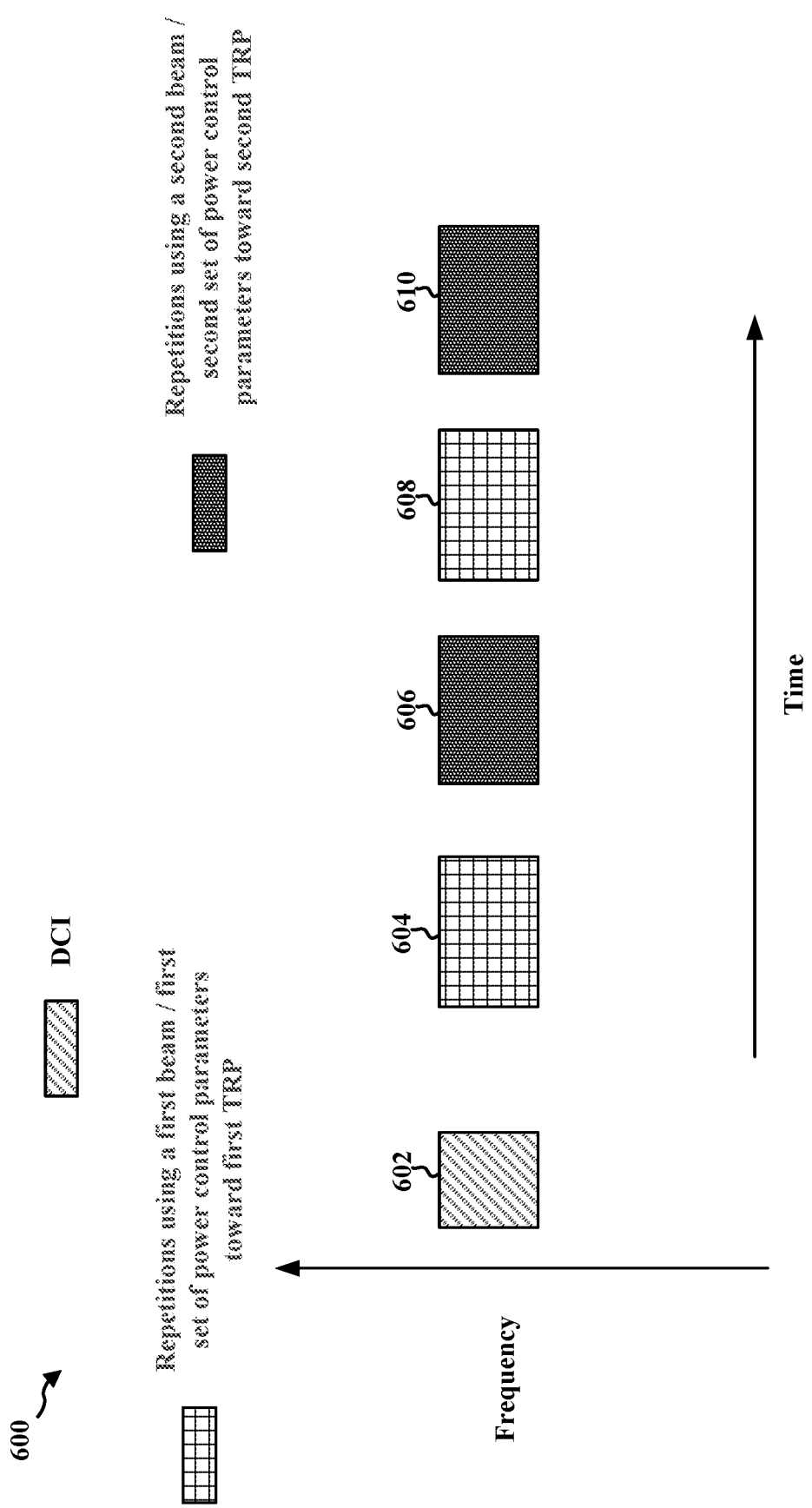
FIG. 6 is a diagram illustrating an example mapping pattern for PUSCH repetitions.

FIG. 6 is a diagram 600 illustrating an example cyclical mapping pattern for PUSCH repetitions. As illustrated in FIG. 6, the DCI 602 may schedule four PUSCH repetitions, PUSCH repetition 604, PUSCH repetition 606, PUSCH repetition 608, and PUSCH repetition 610. For cyclical beam mapping, the first PUSCH repetition 604 and the third PUSCH repetition 608 may be associated with a first beam and a first set of power control parameters. The second PUSCH repetition 606 and the fourth PUSCH repetition 610 may be associated with a second beam and a second set of power control parameters. The cyclical mapping pattern may be applicable for both Type A and Type B repetitions.

Figure 7:
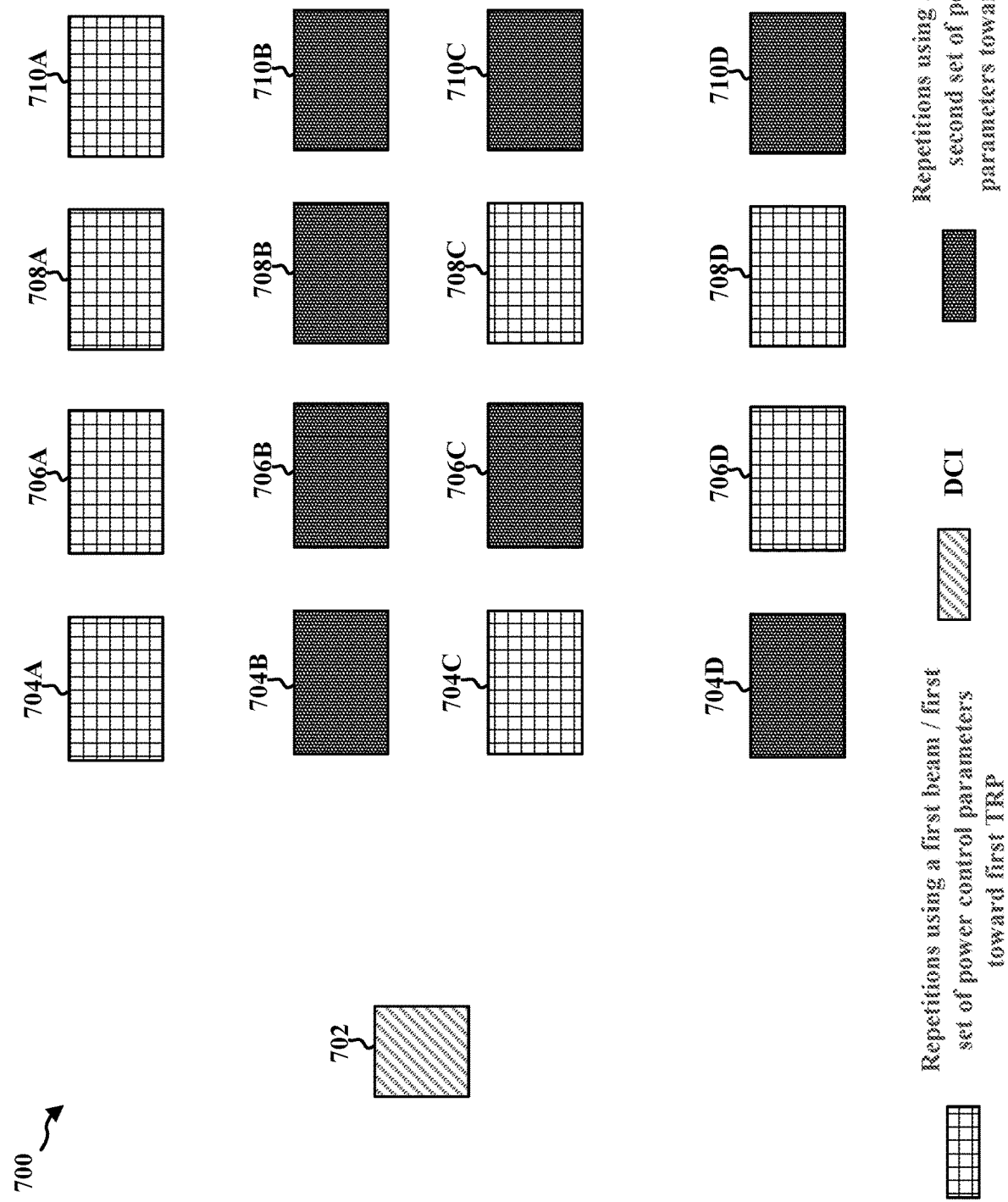
FIG. 7 is a diagram illustrating an example mapping pattern for PUSCH repetitions.

FIG. 7 is a diagram 700 illustrating an example mapping pattern for PUSCH repetitions. As illustrated in FIG. 7, the DCI 702 schedule may schedule four PUSCH repetitions. The four PUSCH repetitions may be arranged differently based on the codepoint in the DCI 702. For example, based on codepoint 0, the four PUSCH repetitions may be PUSCH repetition 704A, PUSCH repetition 706A, PUSCH repetition 708A, and PUSCH repetition 710A, which may be all based on the first beam and the first set of power control parameters (and toward the first TRP). Based on codepoint 1, the four PUSCH repetitions may be PUSCH repetition 704B, PUSCH repetition 706B, PUSCH repetition 708B, and PUSCH repetition 710B, which may be all based on the second beam and the second set of power control parameters (and toward the second TRP). Based on codepoint 2, the four PUSCH repetitions may be PUSCH repetition 704C, PUSCH repetition 706C, PUSCH repetition 708C, and PUSCH repetition 710C, where the PUSCH repetition 704C and the PUSCH repetition 708C may be based on the first beam and the first set of power control parameters (and toward the first TRP) and the PUSCH repetition 706C and the PUSCH repetition 710C may be based on the second beam and the second set of power control parameters (and toward the second TRP). Based on codepoint 3, the four PUSCH repetitions may be PUSCH repetition 704D, PUSCH repetition 706D, PUSCH repetition 708D, and PUSCH repetition 710D, where the PUSCH repetition 706D and the PUSCH repetition 710D may be based on the first beam and the first set of power control parameters (and toward the first TRP) and the PUSCH repetition 704D and the PUSCH repetition 708D may be based on the second beam and the second set of power control parameters (and toward the second TRP).

In some aspects, a PUSCH transmission may be based on SDM and may be associated with multiple sets of DM-RS ports, which may be in turn respectively associated with multiple sets of MIMO layers in multiple panels at the UE. The PUSCH transmission may be transmitted based on the multiple sets of MIMO layers in multiple panels at the UE with different transmission beams, precoders, and power control parameters. For example, a first portion of the PUSCH transmission may be transmitted via a first set of MIMO layers associated with a first set of DM-RS ports via a first panel using a first transmission beam (and associated TCI state) to a first TRP of a base station. A second portion of the PUSCH transmission may be transmitted via a second set of MIMO layers associated with a second set of DM-RS ports via a second panel using a second transmission beam (and associated TCI state) to a second TRP of a base station. Such a PUSCH transmission may be based on one TB and one CW or more than one TB and more than one CW. A TB may be a payload of data passed between a medium access control (MAC) layer and a PHY layer for transmitting data in the TB. The PHY layer may convert the TB into a CW by appending (which may also be referred to as "scrambling") a cyclic redundancy check (CRC) to the TB, segment the TB into multiple code blocks of configured size (e.g., segmented into code blocks between 40 and 6144 bits) or padded to a configured size (e.g., padded to 40 bits with 0s if the TB is smaller than 40 bits), then process each code block with a turbo coder and reassemble the code blocks into a CW. Such a process after appending CRC may also be collectively referred to as encoding and modulation.

Figure 8:
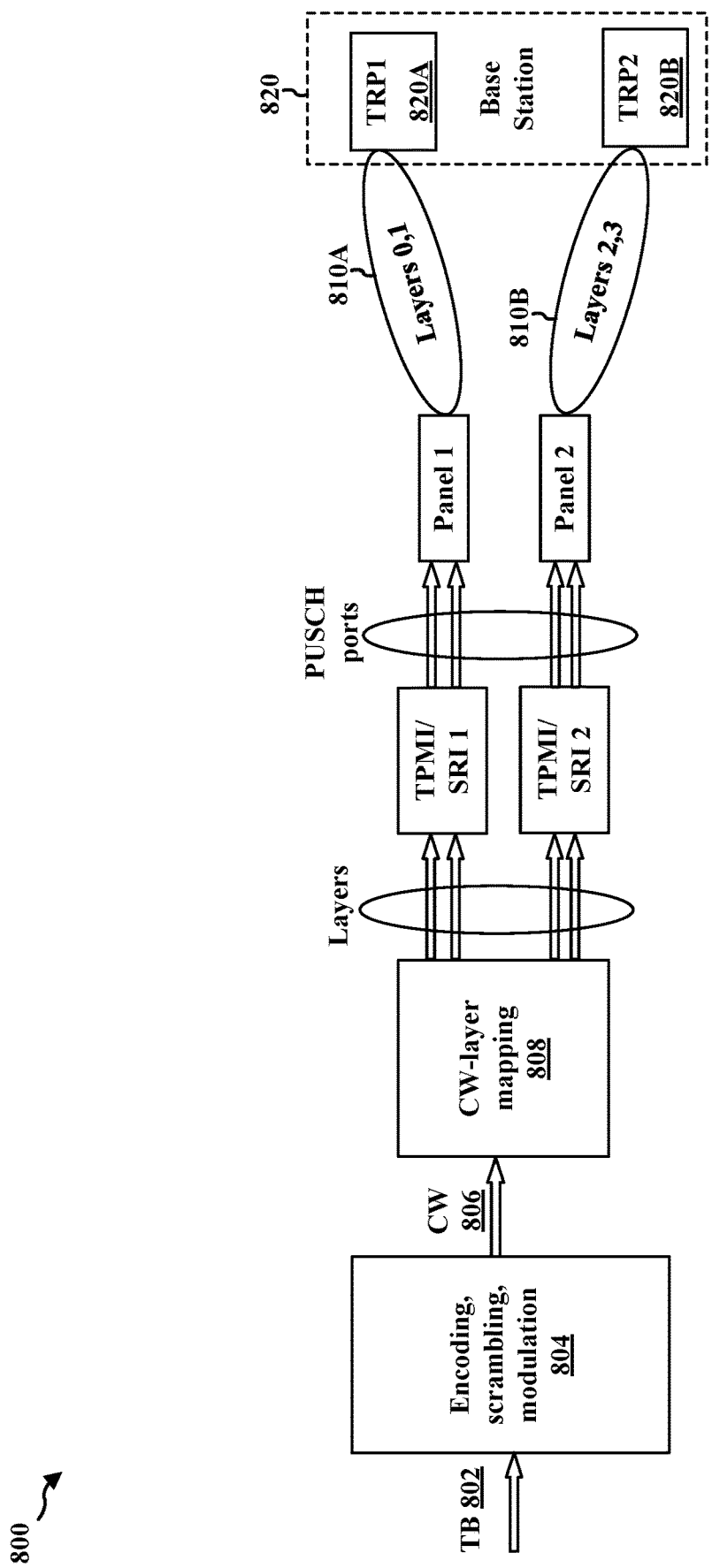
FIG. 8 is a diagram illustrating an example of a first mode of processing SDM PUSCH transmission.

As used herein, the term "SDM PUSCH" may refer to a PUSCH transmission that includes different portions based on SDM. As used herein, the term "repetition" and "portion" may be used interchangeably to refer to repetitions of a PUSCH. FIG. 8 is a diagram 800 illustrating a first mode of processing SDM PUSCH transmission (Mode 1). As illustrated in FIG. 8, to transmit a PUSCH transmission, a single TB 802 may be used for generating a CW 806 after encoding, scrambling, and modulation at 804. The CW 806 may be mapped to (at 808) a first set of MIMO layers 810A associated with a first SRI/TPMI (e.g., as indicated by DCI) associated with a first panel of the UE, and then transmitted using a transmit beam associated with the first set of MIMO layers 810A to a first TRP 820A of the base station 820. The CW 806 may also be mapped to (at 808) a second set of MIMO layers 810B associated with a second SRI/TPMI (e.g., as indicated by DCI) associated with a second panel of the UE, and then transmitted using a transmit beam associated with the second set of MIMO layers 810B to a second TRP 820B of the base station 820. Transmitting different portions of the PUSCH transmission that correspond with transmission using different set of layers that are respectively associated with different panels and beams based on a same TB and a same CW may be a first mode of processing SDM PUSCH transmission. A single NDI, a single RV, and a single MCS may be used for the TB 802 and the CW 806.

Figure 9:
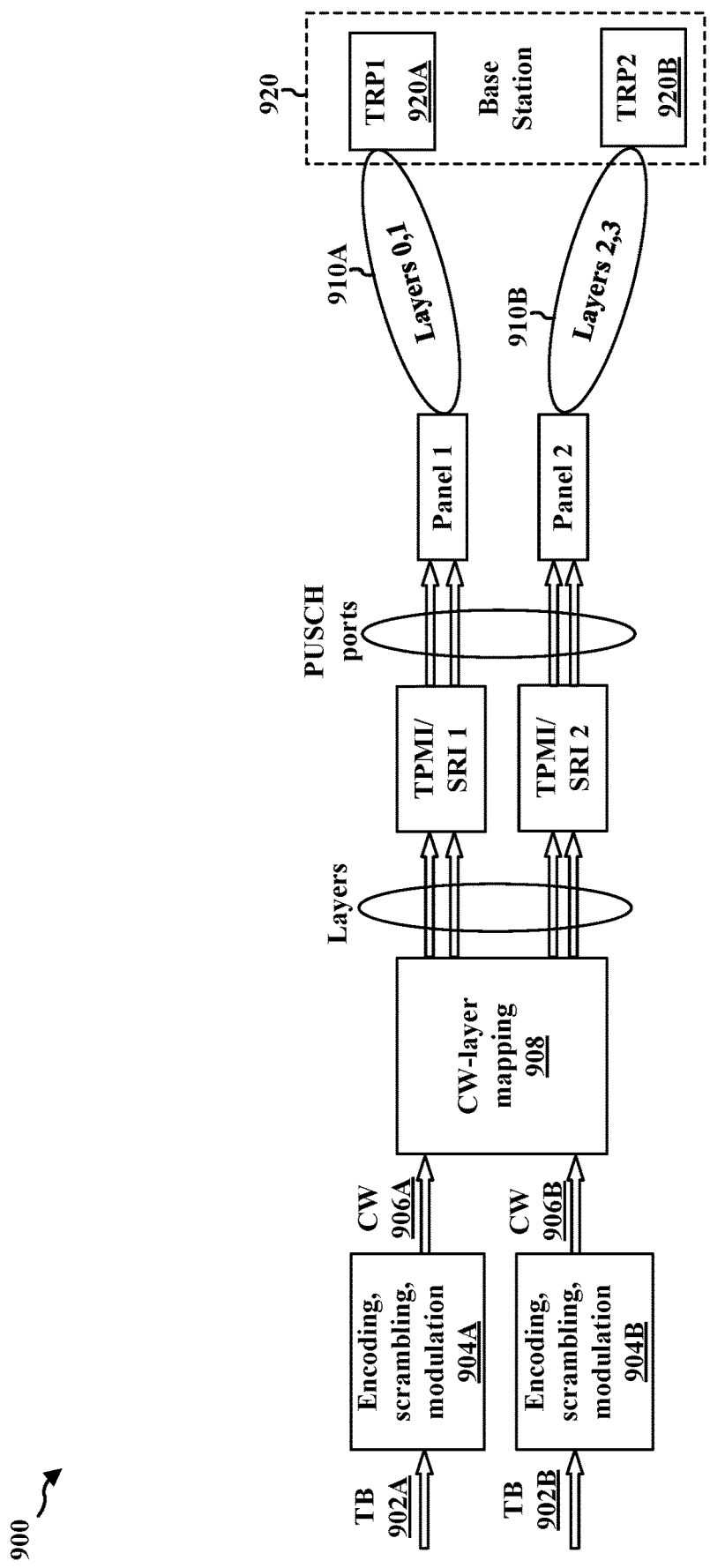
FIG. 9 is a diagram illustrating example of a second mode of processing SDM PUSCH transmission.

FIG. 9 is a diagram 900 illustrating example of a second mode of processing SDM PUSCH transmission. As illustrated in FIG. 9, to transmit a PUSCH transmission, a first portion of the PUSCH transmission may correspond to a first TB 902A, which may be used for generating a CW 906A after encoding, scrambling, and modulation at 904A. The CW 906A may be mapped to (at 908) a first set of MIMO layers 910A associated with a first SRI/TPMI (e.g., as indicated by DCI) associated with a first panel of the UE, and then transmitted using a transmit beam associated with the first set of MIMO layers 910A to a first TRP 920A of the base station 920. A second portion of the PUSCH transmission may correspond to a second TB 902B, which may be used for generating a CW 906B after encoding, scrambling, and modulation at 904B. The CW 906B may be mapped to (at 908) a second set of MIMO layers 910B associated with a second SRI/TPMI (e.g., as indicated by DCI) associated with a second panel of the UE, and then transmitted using a transmit beam associated with the second set of MIMO layers 910B to a second TRP 920B of the base station 920. The TB 902A may be associated with a first modulation and coding scheme (MCS), a first redundancy version (RV), and a first new data indicator (NDI). The TB 902B may be associated with a second MCS, a second RV, and a second NDI. The first MCS, first RV, and the first NDI may be represented by a DCI in one or more fields separate from one or more fields representing the second MCS, the second RV, and the second NDI. A value of the first MCS may be identical with or different from the second MCS. A value of the first NDI may be identical with or different from the second NDI. A value of the first RV may be identical with or different from the second RV. Transmitting different portions of the PUSCH transmission that correspond with transmission using different set of layers that are respectively associated with different panels and beams based on different TBs and different CWs may be a second mode of processing SDM PUSCH transmission (Mode 2).

The first mode of processing SDM PUSCH transmission and the second mode of processing SDM PUSCH transmission may provide different advantages that may be situational. For example, the first mode may be more suitable to reliability/diversity as the TB is mapped to layers from both sets, which means that if one beam is blocked, the TB may be still decoded from the layers mapped to the other beam. The second mode may be more suitable for capacity increase because different MCS may be used to adapt the coding rate and modulation order to the effective signal to interference and noise ratio (SINR) of each set of layers/each beam. Aspects provided herein may enable a UE to distinguish and determine how to process SDM PUSCH transmission. Aspects provided herein may also enable a UE to use different CWs and TBs associated with different NDI, RV, and MCS regardless of whether the UE is operating in sTRP or mTRP. Aspects provided herein may also provide additional modes of processing SDM PUSCH transmission that may be more efficient.

Figure 10:
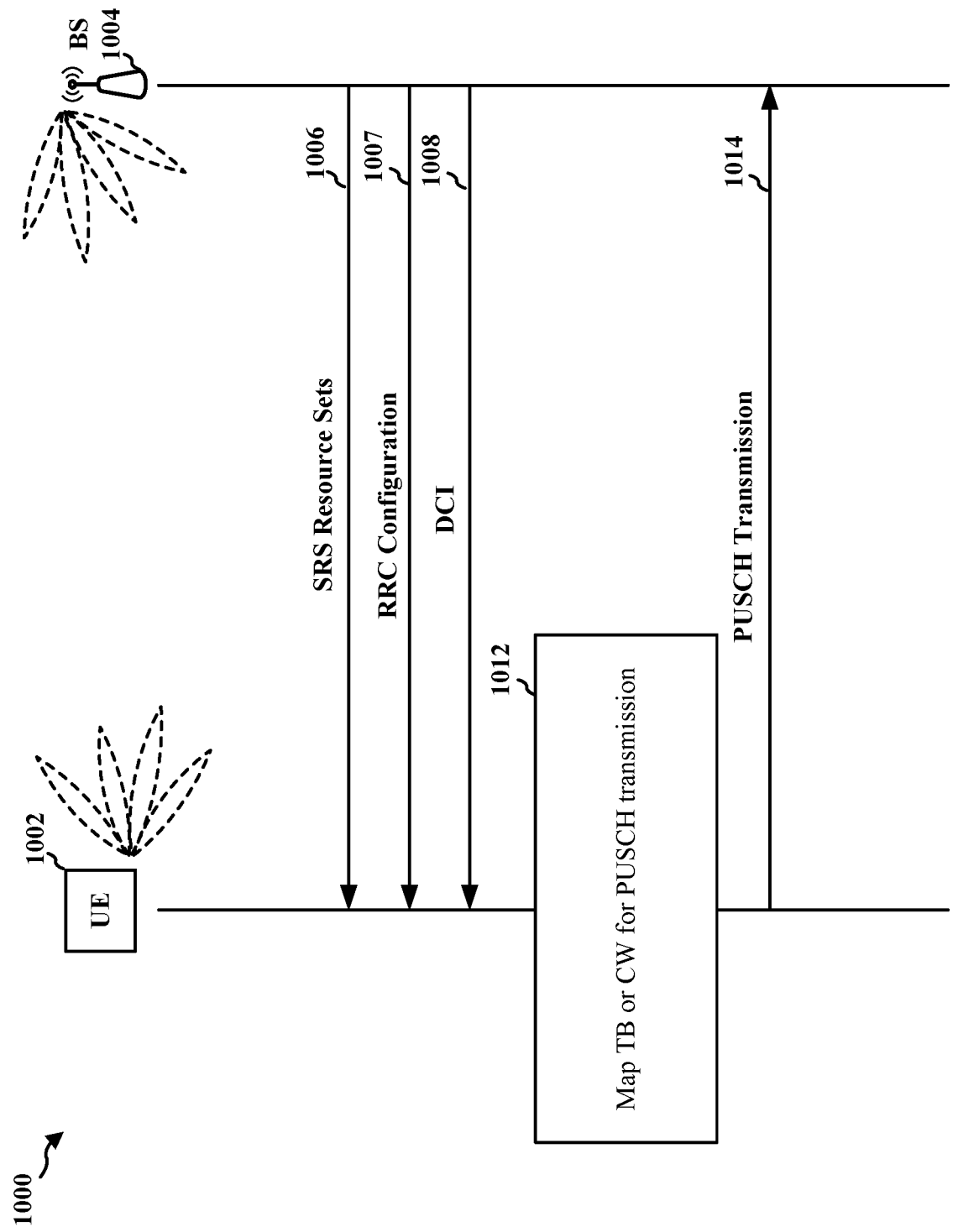
FIG. 10 is a diagram illustrating example communications between a UE and a network entity.

FIG. 10 is a diagram 1000 illustrating example communications between a UE 1002 and a network entity 1004 (e.g., a base station). The network entity 1004 may be a network node. A network node may be implemented as an aggregated base station, as a disaggregated base station, an IAB node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

As illustrated in FIG. 10, the network entity 1004 may configure the UE 1002 with at least two SRS resource sets 1006, which may be configured based on a RRC configuration 1007. In some aspects, each of the SRS resource sets 1006 may include an SRS resource set ID, which may be represented by an srs-ResourceSetID field in an SRS-ResourceSet parameter. In some aspects, the network entity 1004 may transmit a DCI 1008 to the UE 1002. In some aspects, the DCI 1008 may include one or more bits, such as two bits (e.g., the codepoints illustrated in Table 2), to indicate an order for different portions/transmissions in the PUSCH transmission 1014. The DCI 1008 may schedule an SDM PUSCH. In some aspects, the DCI 1008 may include at least two sets of MIMO layers that may be respectively associated with at least two sets of DM-RS ports respectively associated with at least two transmit beams (and TCI states) or two SRS resource sets. The UE 1002 may determine whether to process the SDM PUSCH (at 1012) based on: 1) one TB and CW is mapped to both sets of MIMO layers (first mode of processing SDM PUSCH), 2) two respective TBs and CWs are mapped to respective sets of layers (second mode of processing SDM PUSCH), or 3) other ways of mapping TB and CW to the MIMO layers (other mode(s) of processing SDM PUSCH), based on the DCI or the RRC configuration 1007. In some aspects, after processing the SDM PUSCH, the UE 1002 may transmit the PUSCH transmission 1014 to the network entity 1004.

In some aspects, the RRC configuration 1007 may be per bandwidth part (BWP) or per serving cell. In some aspects, the RRC configuration 1007 may configure one mode of processing SDM PUSCH and the UE 1002 may process the SDM PUSCH accordingly at 1012. In some aspects, the RRC configuration 1007 may configure more than mode of processing SDM PUSCH and the UE 1002 may use additional signaling to determine which mode to use when processing the SDM PUSCH at 1012.

In some aspects, the DCI 1008 may explicitly or implicitly indicate the first mode of processing SDM PUSCH or the second mode of processing SDM PUSCH. In some aspects, the DCI 1008 may include two MCS/NDI/RV fields including a first set of MCS/RV/NDI fields and a second set of MCS/RV/NDI fields associated with two TBs including a first TB and a second TB. The DCI may dynamically disable (e.g., in the DCI 1008 or in another DCI) one of the TBs based on the MCS/RV/NDI values for the corresponding TB being set to one or more configured values. If neither the first set of MCS/RV/NDI fields nor the second set of MCS/RV/NDI fields associated with a TB is disabled, the UE 1002 may process the SDM PUSCH based on the second mode. If the first set of MCS/RV/NDI fields and the second set of MCS/RV/NDI fields are not disabled, the UE 1002 may process the SDM PUSCH based on the first mode.

In some aspects, an SRS resource set indicator (such as the codepoint) in the DCI 1008 may be used for indicating the first mode of processing SDM PUSCH and the second mode of processing SDM PUSCH. An example is illustrated in Table 3 below:

TABLE 3

| Codepoint | SRS resource set(s) |
| --- | --- |
| 0 | s-TRP mode with $1^{st}$ SRS resource set (TRP1) |
| 1 | s-TRP mode with $2^{nd}$ SRS resource set (TRP2) |
| 2 | SDM PUSCH Mode 1 (TRP1, TRP2): $1^{st}$ set of layers: $1^{st}$ SRS resource set $2^{nd}$ set of layers: $2^{nd}$ SRS resource set |
| 3 | SDM PUSCH Mode 1 (TRP2, TRP1): $1^{st}$ set of layers: $2^{nd}$ SRS resource set $2^{nd}$ set of layers: $1^{st}$ SRS resource set |
| 4 | SDM PUSCH Mode 2 (TRP1, TRP2): Layers of $1^{st}$ TB: $1^{st}$ SRS resource set Layers of $2^{nd}$ TB: $2^{nd}$ SRS resource set |

TABLE 3-continued

| Codepoint | SRS resource set(s) |
| --- | --- |
| 5 | SDM PUSCH Mode 2 (TRP2, TRP1):<br>Layers of $1^{st}$ TB: $2^{nd}$ SRS resource set<br>Layers of $2^{nd}$ TB: $1^{st}$ SRS resource set |

As illustrated in table 3, for Mode 2, SRS resource set indicator may also indicate whether layers of the first TB or the second TB map to the first SRS resource set or the second SRS resource set. As illustrated in table 3, codepoint 0 and codepoint 1 may indicate that the PUSCH is based on sTRP without SDM. Codepoint 2 may indicate using the first mode of processing SDM PUSCH where a single TB is mapped to different portions of the SDM PUSCH based on different sets of MIMO layers towards different TRPs (and additionally indicate the association between the SRS resource sets and the sets of MIMO layers). Codepoint 3 may indicate using the first mode of processing SDM PUSCH where a single TB is mapped to different portions of the SDM PUSCH based on different sets of MIMO layers towards different TRPs (and additionally indicate the association between the SRS resource sets and the sets of MIMO layers). Codepoint 4 may indicate using the second mode of processing SDM PUSCH where different TBs are mapped to different portions of the SDM PUSCH based on different sets of MIMO layers towards different TRPs (and additionally indicate the association between the SRS resource sets and the sets of MIMO layers). Codepoint 5 may indicate using the second mode of processing SDM PUSCH where different TBs are mapped to different portions of the SDM PUSCH based on different sets of MIMO layers towards different TRPs (and additionally indicate the association between the SRS resource sets and the sets of MIMO layers). Similarly, the codepoints may be used for indicating other modes of processing SDM PUSCH.

In some aspects, the UE 1002 may determine whether to use the first mode of processing SDM PUSCH, the second mode of processing SDM PUSCH, or other mode(s) of processing SDM PUSCH at 1012 based on a number of layers in the first set (which may be indicated by the first SRI field or TPMI field in the DCI 1008 and may be represented by r1) and a number of layers in the second set (which may be indicated by the second SRI field or TPMI field in the DCI 1008 and may be represented by r2). For example, (r1,r2)=(1,1), (2,1), (1,2), Mode 1 may be used. For (r1,r2)=(2,2), Mode 2 may be used.

In some aspects, if a PUSCH is scheduled with a configured number (such as 4) or smaller number of layers, and the DCI 1008 includes two sets of MCS/RV/NDI fields, the UE 1002 may determine whether one CW and one TB is mapped to all MIMO layers, or two CWs and two TBs are mapped to two sets of MIMO layers based on whether the PUSCH is associated with one SRS resource set or one TCI state, or two SRS resource sets or two TCI states. In some aspects, if two to four layers are used for the PUSCH, Mode 2 may be used (and two TBs or two CWs may be used). There may be two sets of MIMO layers associated with the two SRS resource sets/two beams (and associated TCI states). In some aspects, when all MIMO layers for transmitting the PUSCH are associated with one SRS resource set and one TCI state, the all MIMO layers may be mapped to one TB and one CW. In such aspects, the DCI 1008 may still include two sets of NDI/RV/MCS fields. In some aspects, whether the PUSCH is associated with one SRS resource set or one TCI state, or two SRS resource sets or two TCI states may be determined based on the SRS resource set indicator in the DCI 1008. If the PUSCH is associated with one SRS resource set or one TCI state, the UE 1002 may ignore a second set of NDI/RV/MCS fields.

Figure 11:
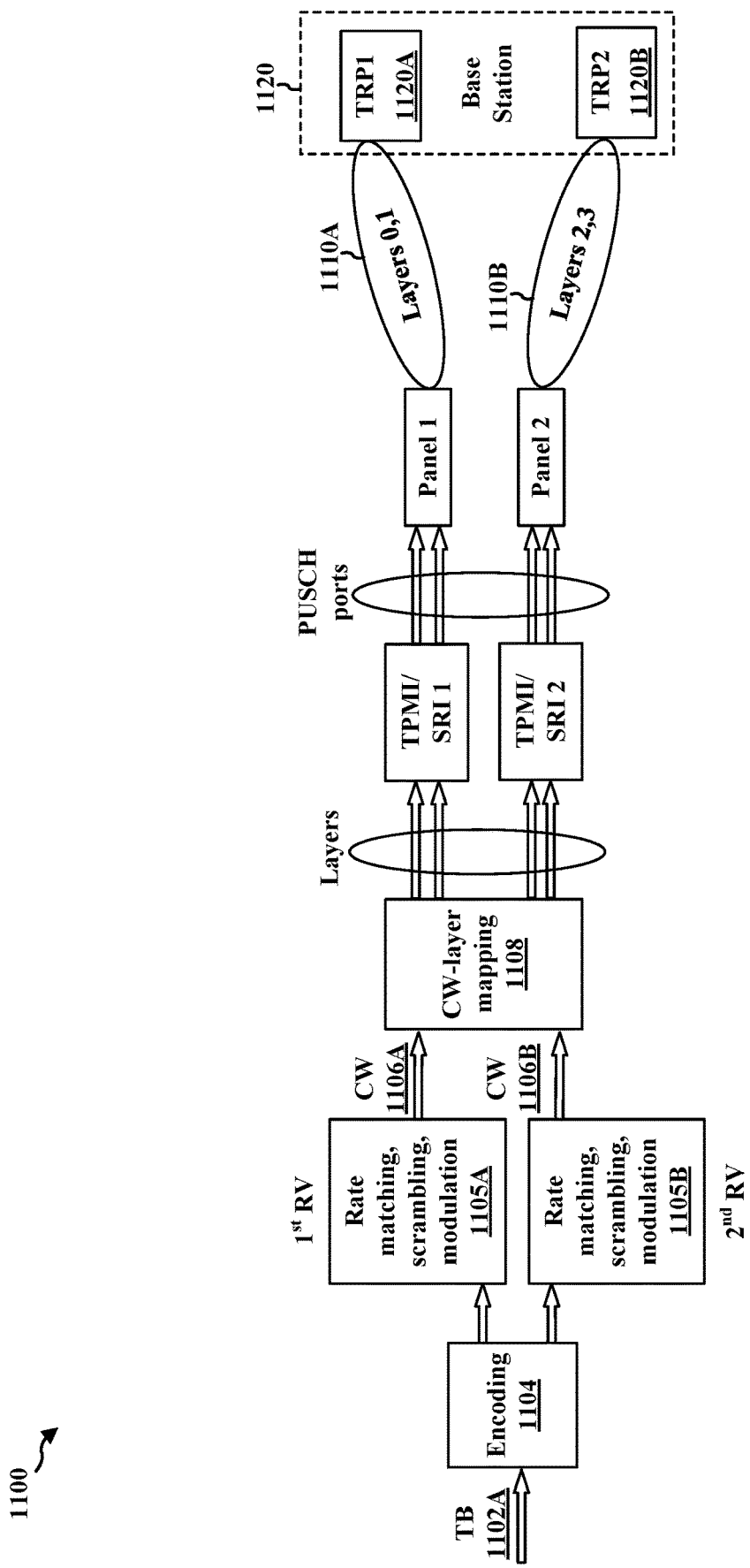
FIG. 11 is a diagram illustrating example of a third mode of processing SDM PUSCH transmission.

In some aspects, the UE 1002 may use a third mode of processing SDM PUSCH transmission. FIG. 11 is a diagram 1100 illustrating example of a third mode of processing SDM PUSCH transmission. As illustrated in FIG. 11, to transmit a PUSCH transmission, a single TB 1102A may be encoded at 1104. After the encoding at 1102A, at 1105A, rate matching may be performed based on a first RV; scrambling and modulation may also be performed at 1105A. Based on the processing at 1105A, a CW 1106A may be generated (based on the TB 1102A and a first RV). At 1105B, rate matching may be performed based on a second RV; scrambling and modulation may also be performed at 1105B. Based on the processing at 1105B, a CW 1106B may be generated (based on the TB 1102A and a second RV). The CW 1106A may be mapped to (at 1108) a first set of MIMO layers 1110A associated with a first SRI/TPMI (e.g., as indicated by DCI) associated with a first panel of the UE, and then transmitted using a transmit beam associated with the first set of MIMO layers 1110A to a first TRP 1120A of the base station 1120. The CW 1106B may be mapped to (at 1108) a second set of MIMO layers 1110B associated with a second SRI/TPMI (e.g., as indicated by DCI) associated with a second panel of the UE, and then transmitted using a transmit beam associated with the second set of MIMO layers 1110B to a second TRP 1120B of the base station 1120.

In other words, the PUSCH may include one TB, which may be encoded, and then separately rate matched using the first RV and the second RV to create first repetition and second repetition of the TB respectively. The modulated symbols of the first repetition may mapped to first set of MIMO layers (associated with the first SRS resource set/first TCI state/first precoding) and the modulated symbols of the second repetition are mapped to second set of MIMO layers (associated with the second SRS resource set/second TCI state/second precoding). As such, each repetition may be self-decodable as rate matching is separate and performance may be better than the first mode if one of the beams is blocked.

In some aspects, the CW 1106A and the CW 1106B are associated with a single NDI and MCS and may be respectively associated with a first RV and a second RV. In some aspects, the first RV and the second RV may be indicated by two RV fields in the DCI 1008. In some aspects, one RV field in the DCI 1008 may indicate the first RV and the second RV may be obtained based on a RV offset that may be independent of the DCI 1008 (such as configured in RRC configuration 1007 or configured without signaling from the network entity 1004).

Figure 12:
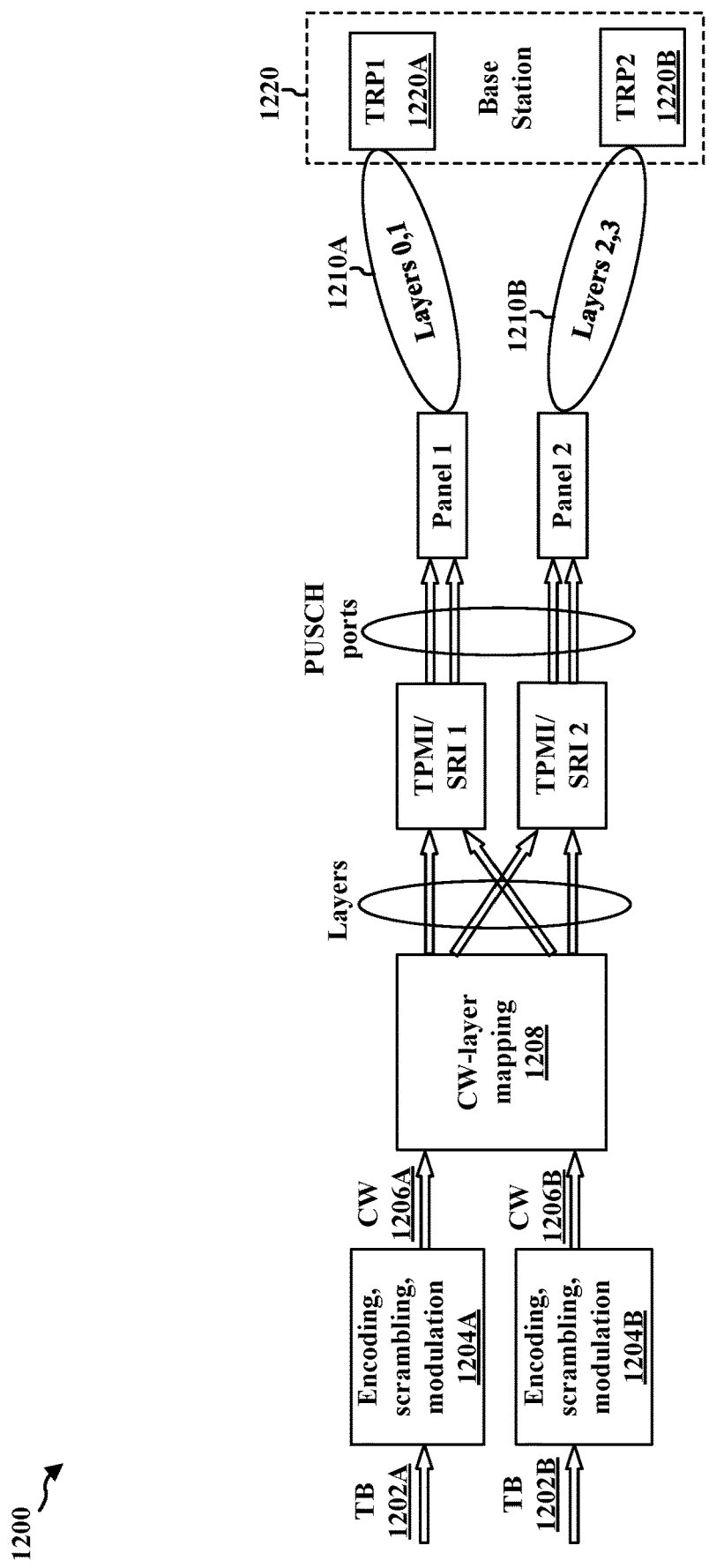
FIG. 12 is a diagram illustrating example of a fourth mode of processing SDM PUSCH transmission.

FIG. 12 is a diagram 1200 illustrating example of a fourth mode of processing SDM PUSCH transmission. As illustrated in FIG. 12, to transmit a PUSCH transmission, a first portion of the PUSCH transmission may correspond to a first TB 1202A, which may be used for generating a CW 1206A after encoding, scrambling, and modulation at 1204A. The CW 1206A may be mapped to (at 1208) at least one layer in a first set of MIMO layers 1210A associated with a first SRI/TPMI (e.g., as indicated by DCI) associated with a first panel of the UE and at least one layer in a second set of MIMO layers 1210B associated with a second SRI/TPMI (e.g., as indicated by DCI) associated with a second panel of the UE. The CW 1206A may be then transmitted using a transmit beam associated with the first set of MIMO layers 1210A to a first TRP 1220A of the base station 1220 and transmitted using a transmit beam associated with the second set of MIMO layers 1210B to a second TRP 1220B of the base station 1220. A second portion of the PUSCH transmission may correspond to a second TB 1202B, which may be used for generating a CW 1206B after encoding, scrambling, and modulation at 1204B. The CW 1206B may be mapped to (at 1208) at least one layer in a first set of MIMO layers 1210A associated with a first SRI/TPMI (e.g., as indicated by DCI) associated with a first panel of the UE and at least one layer in a second set of MIMO layers 1210B associated with a second SRI/TPMI (e.g., as indicated by DCI) associated with a second panel of the UE. The CW 1206B may be then transmitted using a transmit beam associated with the first set of MIMO layers 1210A to a first TRP 1220A of the base station 1220 and transmitted using a transmit beam associated with the second set of MIMO layers 1210B to a second TRP 1220B of the base station 1220. Such a mode may enhance reliability for each of the two TB s (or at least one of the two TB s) as the layers of the TB are mapped to layers from both beams while the two TB s/CWs may be scheduled with different MCS.

Figure 13:
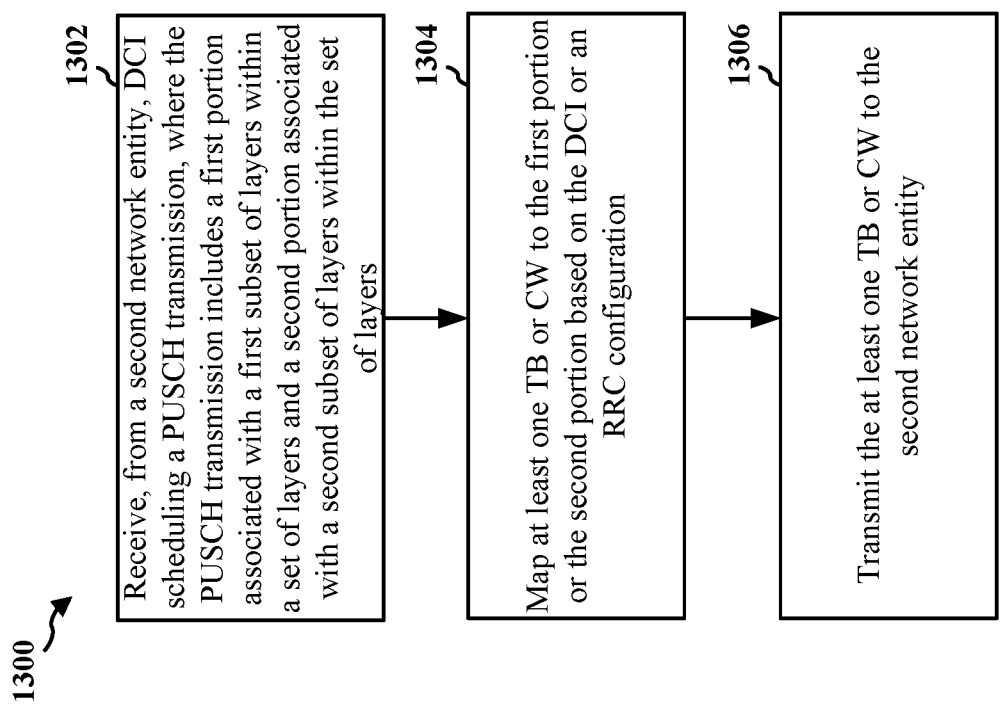
FIG. 13 is a flowchart of a method of wireless communication.

FIG. 13 is a flowchart 1300 of a method of wireless communication. The method may be performed by a first network entity (e.g., the UE 104, the UE 1002; the apparatus 1504).

At 1302, the first network entity may receive, from a second network entity, DCI scheduling a PUSCH transmission, where the PUSCH transmission includes a first portion associated with a first subset of layers within a set of layers and a second portion associated with a second subset of layers within the set of layers. For example, the UE 1002 may receive, from a second network entity (e.g., 1004), DCI 1008 scheduling a PUSCH transmission, where the PUSCH transmission includes a first portion associated with a first subset of layers within a set of layers and a second portion associated with a second subset of layers within the set of layers. In some aspects, 1302 may be performed by the PUSCH component 198. In some aspects, the DCI includes a first indication associated with a first modulation and coding scheme (MCS), a first new data indicator (NDI), or a first redundancy version (RV), where the first indication may be associated with a first TB or a first CW associated with the first subset of layers, where the DCI includes a second indication associated with a second MCS, a second NDI, or a second RV, where the second indication may be associated with a second TB or a second CW associated with the second subset of layers.

At 1304, the first network entity may map at least one TB or CW to the first portion or the second portion based on the DCI or an RRC configuration. For example, the UE 1002 may map (e.g., at 1012) at least one TB or CW to the first portion or the second portion based on the DCI or an RRC configuration 1007. In some aspects, 1304 may be performed by the PUSCH component 198. In some aspects, to map the at least one TB or CW to the first portion or the second portion based on the DCI or the RRC configuration, the first network entity may map the at least one TB or CW to the first portion or the second portion based on the RRC configuration, and the RRC configuration may be associated with a bandwidth part (BWP) or a serving cell. In some aspects, to map the at least one TB or CW to the first portion or the second portion based on the DCI or the RRC configuration, the first network entity may map the at least one TB or CW to the first portion or the second portion based on the DCI. In some aspects, the DCI includes an SRS resource set indicator, and where the first network entity may map the at least one TB or CW to the first portion or the second portion based on the SRS resource set indicator. In some aspects, the SRS resource set indicator indicates a first SRS resource set associated with the first subset of layers and a second SRS resource set associated with the second subset of layers. In some aspects, to map the at least one TB or CW to the first portion or the second portion based on the DCI or the RRC configuration, the first network entity may map the at least one TB or CW to the first portion or the second portion based on a first number of layers associated with the first subset of layers and a second number of layers associated with the second subset of layers. In some aspects, to map the at least one TB or CW to the first portion or the second portion based on the DCI or the RRC configuration, the first network entity may map the at least one TB or CW to the first portion or the second portion based on a number of SRS resource sets associated with the PUSCH transmission, and where the DCI includes a first indication associated with a first MCS, a first NDI, or a first RV, where the first indication may be associated with a first TB or a first CW associated with the first subset of layers, where the DCI includes a second indication associated with a second MCS, a second NDI, or a second RV, where the second indication may be associated with a second TB or a second CW associated with the second subset of layers. In some aspects, the number of SRS resource sets associated with the PUSCH transmission may be one, and where the DCI further includes a disable indication, where the disable indication may be configured to cause the first network entity to refrain from using the first MCS, the first NDI, or the first RV associated with the first indication or refrain from using the second MCS, the second NDI, or the second RV associated with the second indication. In some aspects, the at least one TB or CW includes one TB, a first CW, and a second CW, and where the first CW may be based on rate matching the one TB using a first RV and the second CW may be based on rate matching the one TB using the second RV. In some aspects, the first RV may be indicated by the DCI, and where the second RV may be indicated by the DCI or configured based on a RV offset relative to the first RV, the RV offset may be independent of the DCI. For example, the RV offset may be independent of DCI based on the DCI not including a field representing the RV offset. The DCI may include a field representing the first RV without a field representing the second RV and without a field representing the RV offset. In some aspects, the RV offset may be configured without base station signaling. In some aspects, the RV offset may be configured based on an RRC configuration, such as the RRC configuration 1007 or a different RRC configuration.

At 1306, the first network entity may transmit the at least one TB or CW to the second network entity. For example, the UE 1002 may transmit the at least one TB or CW (e.g., the PUSCH transmission 1014) to the second network entity (e.g., 1004). In some aspects, 1306 may be performed by the PUSCH component 198. In some aspects, the DCI further includes a disable indication, where the disable indication may be configured to cause the first network entity to refrain from using the second MCS, the second NDI, or the second RV associated with the second indication, and where the at least one TB or CW correspond to the first TB or the first CW based on the disable indication. In some aspects, the at least one TB or CW includes a first TB or a first CW and a second TB or a second CW, and where at least one of the first CW or the second CW may be associated with at least one first layer of the first subset of layers and at least one second layer of the second subset of layers.

Figure 14:
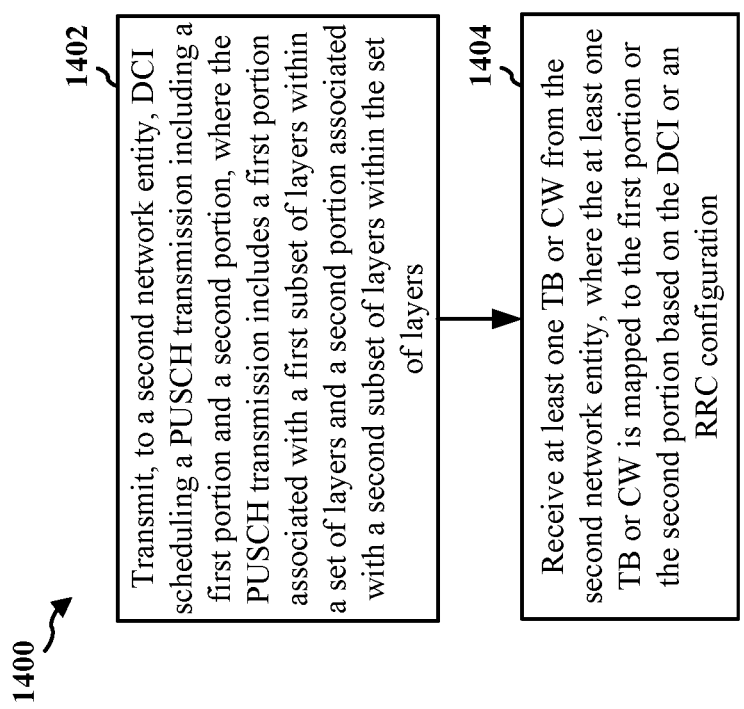
FIG. 14 is a flowchart of a method of wireless communication.

FIG. 14 is a flowchart 1400 of a method of wireless communication. The method may be performed by a first network entity (e.g., the base station 102, the network entity 1004, the network entity 1502, the network entity 1602).

At 1402, the first network entity may transmit, to a second network entity, DCI scheduling a PUSCH transmission including a first portion and a second portion, where the PUSCH transmission includes a first portion associated with a first subset of layers within a set of layers and a second portion associated with a second subset of layers within the set of layers. For example, the network entity 1004 may transmit, to a second network entity (e.g., the UE 1002), DCI 1008 scheduling a PUSCH transmission including a first portion and a second portion, where the PUSCH transmission includes a first portion associated with a first subset of layers within a set of layers and a second portion associated with a second subset of layers within the set of layers. In some aspects, 1402 may be performed by the PUSCH component 199. In some aspects, the DCI includes a first indication associated with a first MCS, a first NDI, or a first RV, where the first indication may be associated with a first TB or a first CW associated with the first subset of layers, where the DCI includes a second indication associated with a second MCS, a second NDI, or a second RV, where the second indication may be associated with a second TB or a second CW associated with the second subset of layers. In some aspects, the DCI further includes a disable indication, where the disable indication indicates refraining from using the second MCS, the second NDI, or the second RV associated with the second indication, and where the at least one TB or CW correspond to the first TB or the first CW based on the disable indication. In some aspects, the DCI includes an SRS resource set indicator, and the at least one TB or CW may be mapped to the first portion or the second portion based on the SRS resource set indicator. In some aspects, the SRS resource set indicator indicates a first SRS resource set associated with the first subset of layers and a second SRS resource set associated with the second subset of layers. In some aspects, the first RV may be indicated by the DCI, and where the second RV may be indicated by the DCI or configured based on a RV offset relative to the first RV, the RV offset may be independent of the DCI. For example, the RV offset may be independent of DCI based on the DCI not including a field representing the RV offset. The DCI may include a field representing the first RV without a field representing the second RV and without a field representing the RV offset. In some aspects, the RV offset may be configured without base station signaling. In some aspects, the RV offset may be configured based on an RRC configuration, such as the RRC configuration 1007 or a different RRC configuration.

At 1404, the first network entity may receive at least one TB or CW from the second network entity, where the at least one TB or CW is mapped to the first portion or the second portion based on the DCI or an RRC configuration. For example, the network entity 1004 may receive at least one TB or CW (e.g., the PUSCH transmission 1014) from the second network entity, where the at least one TB or CW is mapped to the first portion or the second portion based on the DCI or an RRC configuration 1007. In some aspects, 1404 may be performed by the PUSCH component 199. In some aspects, the at least one TB or CW may be mapped to the first portion or the second portion based on the RRC configuration, and where the RRC configuration may be associated with a BWP or a serving cell. In some aspects, the at least one TB or CW may be mapped to the first portion or the second portion based on the DCI. In some aspects, the at least one TB or CW may be mapped to the first portion or the second portion based on a first number of layers associated with the first subset of layers and a second number of layers associated with the second subset of layers. In some aspects, the at least one TB or CW may be mapped to the first portion or the second portion based on a number of SRS resource sets associated with the PUSCH transmission, and where the DCI includes a first indication associated with a first MCS, a first NDI, or a first RV, where the first indication may be associated with a first TB or a first CW associated with the first subset of layers, where the DCI includes a second indication associated with a second MCS, a second NDI, or a second RV, where the second indication may be associated with a second TB or a second CW associated with the second subset of layers. In some aspects, the number of SRS resource sets associated with the PUSCH transmission may be one, and where the DCI includes a disable indication indicating refraining from using the first MCS, the first NDI, or the first RV associated with the first indication or refraining from using second MCS, the second NDI, or the second RV associated with the second indication. In some aspects, the at least one TB or CW includes one TB, a first CW, and a second CW, and where the first CW may be based on rate matching the one TB using a first RV and the second CW may be based on rate matching the one TB using the second RV. In some aspects, the at least one TB or CW includes a first TB or a first CW and a second TB or a second CW, and where at least one of the first CW or the second CW may be associated with at least one first layer of the first subset of layers and at least one second layer of the second subset of layers.

Figure 15:
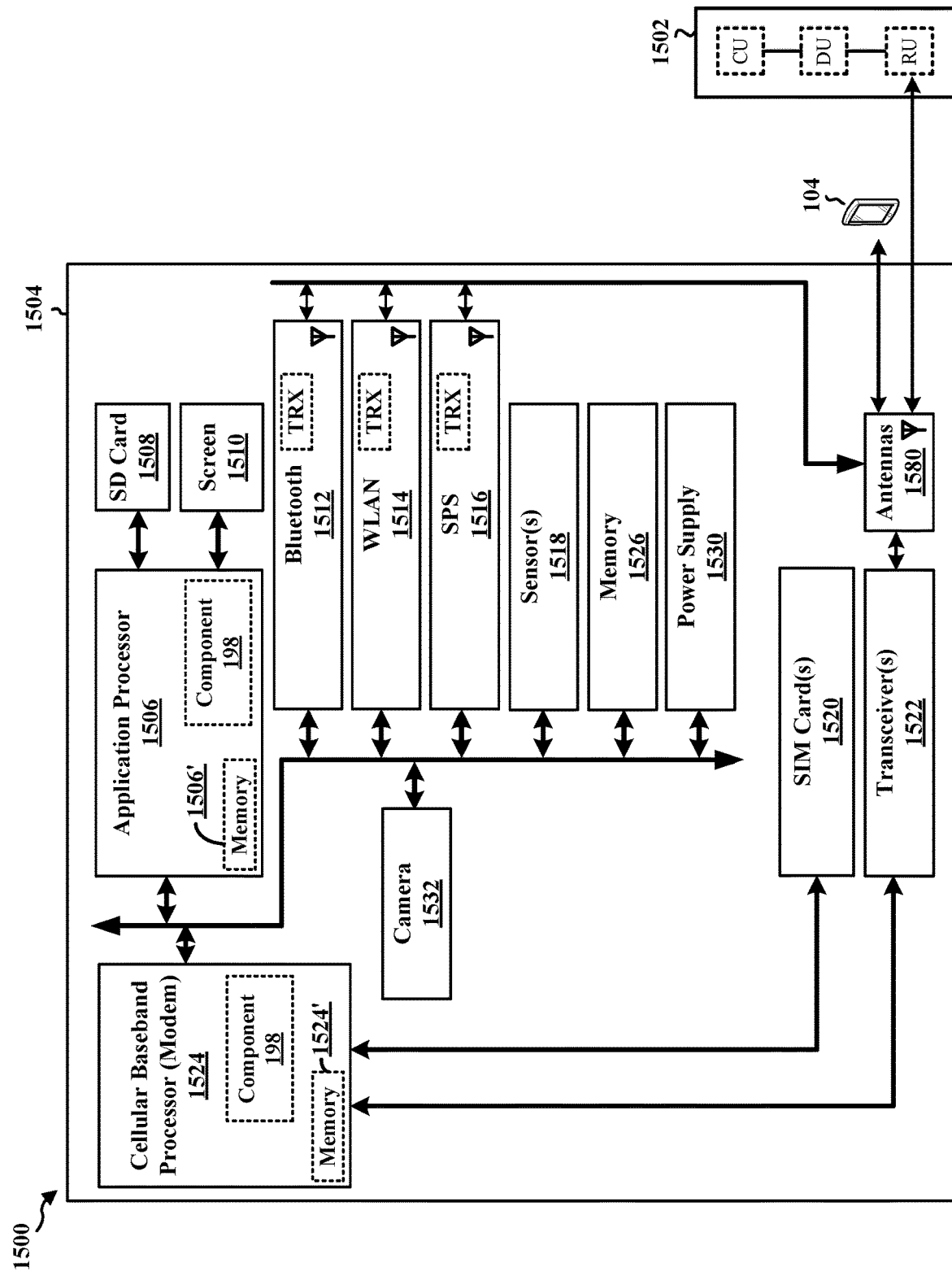
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, a satellite system module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the satellite system module 1516 may include an on-chip transceiver (TRX)/receiver (RX). The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described herein. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed herein, the PUSCH component 198 may be configured to receive, from a second network entity, DCI scheduling a PUSCH transmission, where the PUSCH transmission includes a first portion associated with a first subset of layers within a set of layers and a second portion associated with a second subset of layers within the set of layers. In some aspects, the PUSCH component 198 may be further configured to map at least one TB or CW to the first portion or the second portion based on the DCI or an RRC configuration. In some aspects, the PUSCH component 198 may be further configured to transmit the at least one TB or CW to the second network entity. The PUSCH component 198 may be within the cellular baseband processor 1524, the application processor 1506, or both the cellular baseband processor 1524 and the application processor 1506. The PUSCH component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving, from a second network entity, DCI scheduling a PUSCH transmission, where the PUSCH transmission includes a first portion associated with a first subset of layers within a set of layers and a second portion associated with a second subset of layers within the set of layers. In some aspects, the apparatus 1504 may further include means for mapping at least one TB or CW to the first portion or the second portion based on the DCI or an RRC configuration. In some aspects, the apparatus 1504 may further include means for transmitting the at least one TB or CW to the second network entity. In some aspects, the means for mapping the at least one TB or CW to the first portion or the second portion based on the DCI or the RRC configuration may include means for mapping the at least one TB or CW to the first portion or the second portion based on a first number of layers associated with the first subset of layers and a second number of layers associated with the second subset of layers. In some aspects, the means for mapping the at least one TB or CW to the first portion or the second portion based on the DCI or the RRC configuration may include means for mapping the at least one TB or CW to the first portion or the second portion based on a number of sounding reference signal (SRS) resource sets associated with the PUSCH transmission. The means may be the PUSCH component 198 of the apparatus 1504 configured to perform the functions recited by the means. As described herein, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
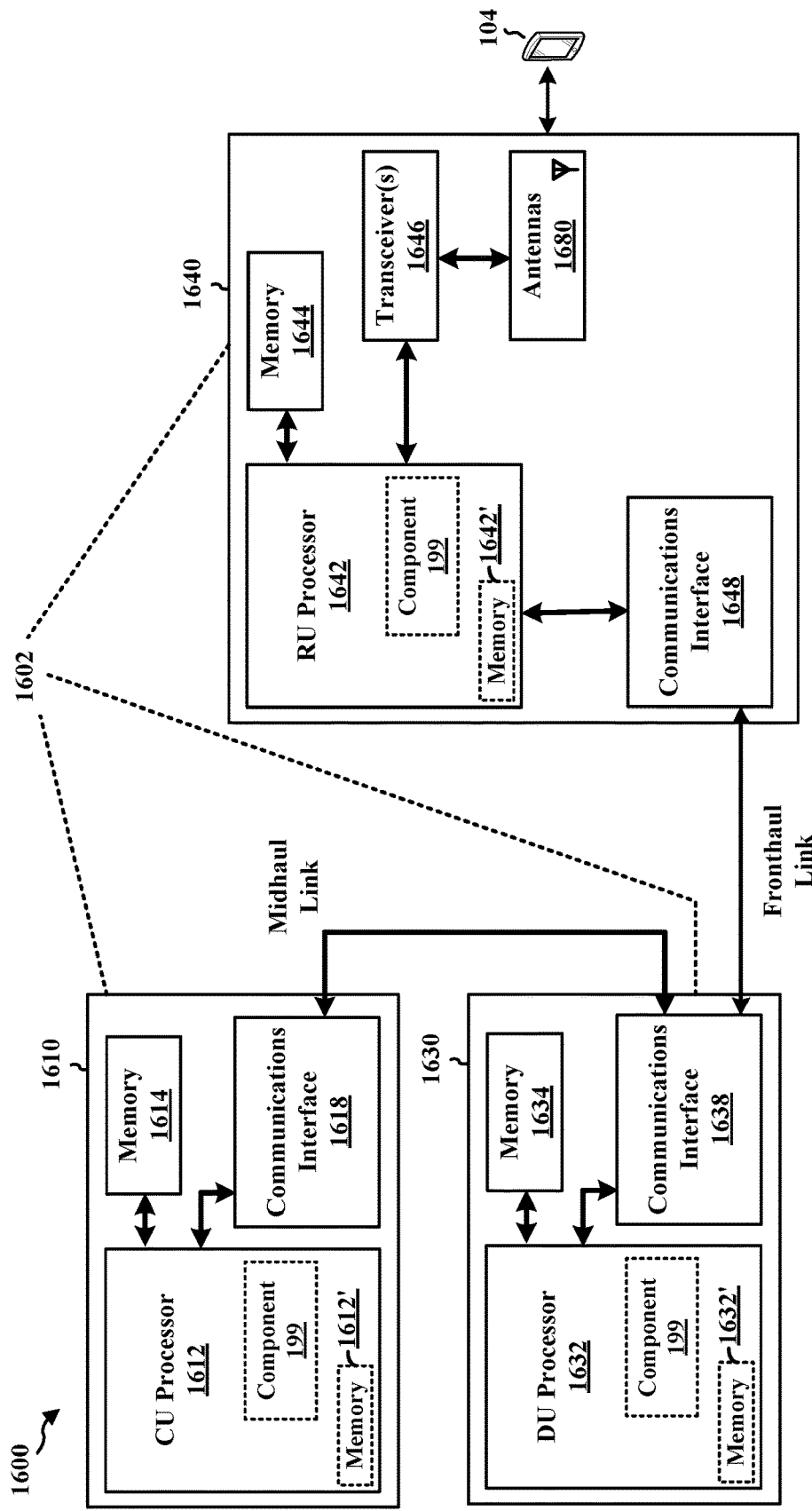
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the PUSCH component 199 may be configured to transmit, to a second network entity, DCI scheduling a PUSCH transmission including a first portion and a second portion, where the PUSCH transmission includes a first portion associated with a first subset of layers within a set of layers and a second portion associated with a second subset of layers within the set of layers. In some aspects, the PUSCH component 199 may be further configured to receive at least one TB or CW from the second network entity, where the at least one TB or CW may be mapped to the first portion or the second portion based on the DCI or an RRC configuration. The PUSCH component 199 may be within one or more processors of one or more of the CU 1610, DU 1630, and the RU 1640. The PUSCH component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for transmitting, to a second network entity, DCI scheduling a PUSCH transmission including a first portion and a second portion, where the PUSCH transmission includes a first portion associated with a first subset of layers within a set of layers and a second portion associated with a second subset of layers within the set of layers. In some aspects, the network entity 1602 may further include means for receiving at least one TB or CW from the second network entity, where the at least one TB or CW may be mapped to the first portion or the second portion based on the DCI or an RRC configuration. The means may be the PUSCH component 199 of the network entity 1602 configured to perform the functions recited by the means. As described herein, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a first network entity for wireless communication, including: a memory; and at least one processor coupled to the memory, where the at least one processor is configured to: receive, from a second network entity, downlink control information (DCI) scheduling a physical uplink shared channel (PUSCH) transmission, where the PUSCH transmission includes a first portion associated with a first subset of layers within a set of layers and a second portion associated with a second subset of layers within the set of layers; map at least one transport block (TB) or codeword (CW) to the first portion or the second portion based on the DCI or a radio resource control (RRC) configuration; and transmit the at least one TB or CW to the second network entity.

Aspect 2 is the first network entity of aspect 1, where to map the at least one TB or CW to the first portion or the second portion based on the DCI or the RRC configuration, the at least one processor is configured to map the at least one TB or CW to the first portion or the second portion based on the RRC configuration, and where the RRC configuration is associated with a bandwidth part (BWP) or a serving cell.

Aspect 3 is the first network entity of any of aspects 1 to 2, where to map the at least one TB or CW to the first portion or the second portion based on the DCI or the RRC configuration, the at least one processor is configured to map the at least one TB or CW to the first portion or the second portion based on the DCI.

Aspect 4 is the first network entity of any of aspects 1 to 3, where the DCI includes a first indication associated with a first modulation and coding scheme (MCS), a first new data indicator (NDI), or a first redundancy version (RV), where the first indication is associated with a first TB or a first CW associated with the first subset of layers, where the DCI includes a second indication associated with a second MCS, a second NDI, or a second RV, where the second indication is associated with a second TB or a second CW associated with the second subset of layers.

Aspect 5 is the first network entity of any of aspects 1-4, where the DCI further includes a disable indication, where the disable indication is configured to cause the at least one processor to refrain from using the second MCS, the second NDI, or the second RV associated with the second indication, and where the at least one TB or CW correspond to the first TB or the first CW based on the disable indication.

Aspect 6 is the first network entity of any of aspects 1-5, where the DCI includes a sounding reference signal (SRS) resource set indicator, and where the at least one processor is configured to map the at least one TB or CW to the first portion or the second portion based on the SRS resource set indicator.

Aspect 7 is the first network entity of any of aspects 1-6, where the SRS resource set indicator indicates a first SRS resource set associated with the first subset of layers and a second SRS resource set associated with the second subset of layers.

Aspect 8 is the first network entity of any of aspects 1-7, where to map the at least one TB or CW to the first portion or the second portion based on the DCI or the RRC configuration, the at least one processor is configured to map the at least one TB or CW to the first portion or the second portion based on a first number of layers associated with the first subset of layers and a second number of layers associated with the second subset of layers.

Aspect 9 is the first network entity of any of aspects 1 to 8, where to map the at least one TB or CW to the first portion or the second portion based on the DCI or the RRC configuration, the at least one processor is configured to map the at least one TB or CW to the first portion or the second portion based on a number of sounding reference signal (SRS) resource sets associated with the PUSCH transmission, and where the DCI includes a first indication associated with a first modulation and coding scheme (MCS), a first new data indicator (NDI), or a first redundancy version (RV), where the first indication is associated with a first TB or a first CW associated with the first subset of layers, where the DCI includes a second indication associated with a second MCS, a second NDI, or a second RV, where the second indication is associated with a second TB or a second CW associated with the second subset of layers.

Aspect 10 is the first network entity of any of aspects 1-9, where the number of SRS resource sets associated with the PUSCH transmission is one, and where the DCI further includes a disable indication, where the disable indication is configured to cause the at least one processor to refrain from using the first MCS, the first NDI, or the first RV associated with the first indication or refrain from using the second MCS, the second NDI, or the second RV associated with the second indication.

Aspect 11 is the first network entity of any of aspects 1 to 10, where the at least one TB or CW includes one TB, a first CW, and a second CW, and where the first CW is based on rate matching the one TB using a first redundancy version (RV) and the second CW is based on rate matching the one TB using the second RV.

Aspect 12 is the first network entity of any of aspects 1 to 11, where the first RV is indicated by the DCI, and where the second RV is indicated by the DCI or configured based on an RV offset relative to the first RV, the RV offset being independent of the DCI.

Aspect 13 is the first network entity of any of aspects 1 to 12, where the at least one TB or CW includes a first TB or a first CW and a second TB or a second CW, and where at least one of the first CW or the second CW is associated with at least one first layer of the first subset of layers and at least one second layer of the second subset of layers.

Aspect 14 is a first network entity for wireless communication, including: a memory; and at least one processor coupled to the memory, where the at least one processor is configured to: transmit, to a second network entity, downlink control information (DCI) scheduling a physical uplink shared channel (PUSCH) transmission, where the PUSCH transmission includes a first portion associated with a first subset of layers within a set of layers and a second portion associated with a second subset of layers within the set of layers; and receive at least one transport block (TB) or codeword (CW) from the second network entity, where the at least one TB or CW is mapped to the first portion or the second portion based on the DCI or a radio resource control (RRC) configuration.

Aspect 15 is the first network entity of aspect 14, where the at least one TB or CW is mapped to the first portion or the second portion based on the RRC configuration, and where the RRC configuration is associated with a bandwidth part (BWP) or a serving cell.

Aspect 16 is the first network entity of any of aspects 14 to 15, where the at least one TB or CW is mapped to the first portion or the second portion based on the DCI.

Aspect 17 is the first network entity of any of aspects 14 to 16, where the DCI includes a first indication associated with a first modulation and coding scheme (MCS), a first new data indicator (NDI), or a first redundancy version (RV), where the first indication is associated with a first TB or a first CW associated with the first subset of layers, where the DCI includes a second indication associated with a second MCS, a second NDI, or a second RV, where the second indication is associated with a second TB or a second CW associated with the second subset of layers.

Aspect 18 is the first network entity of any of aspects 14 to 17, where the DCI further includes a disable indication, where the disable indication indicates refraining from using the second MCS, the second NDI, or the second RV associated with the second indication, and where the at least one TB or CW correspond to the first TB or the first CW based on the disable indication.

Aspect 19 is the first network entity of any of aspects 14 to 18, where the DCI includes a sounding reference signal (SRS) resource set indicator, and the at least one TB or CW is mapped to the first PUSCH transmission or the second PUSCH transmission based on the SRS resource set indicator.

Aspect 20 is the first network entity of any of aspects 14 to 19, where the SRS resource set indicator indicates a first SRS resource set associated with the first subset of layers and a second SRS resource set associated with the second subset of layers.

Aspect 21 is the first network entity of any of aspects 14 to 20, where the at least one TB or CW is mapped to the first portion or the second portion based on a first number of layers associated with the first subset of layers and a second number of layers associated with the second subset of layers.

Aspect 22 is the first network entity of any of aspects 14 to 21, where the at least one TB or CW is mapped to the first portion or the second portion based on a number of sounding reference signal (SRS) resource sets associated with the PUSCH transmission, and where the DCI includes a first indication associated with a first modulation and coding scheme (MCS), a first new data indicator (NDI), or a first redundancy version (RV), where the first indication is associated with a first TB or a first CW associated with the first subset of layers, where the DCI includes a second indication associated with a second MCS, a second NDI, or a second RV, where the second indication is associated with a second TB or a second CW associated with the second subset of layers.

Aspect 23 is the first network entity of any of aspects 14 to 22, where the number of SRS resource sets associated with the PUSCH transmission is one, and where the DCI includes a disable indication indicating refraining from using the first MCS, the first NDI, or the first RV associated with the first indication or refraining from using the second MCS, the second NDI, or the second RV associated with the second indication.

Aspect 24 is the first network entity of any of aspects 14 to 23, where the at least one TB or CW includes one TB, a first CW, and a second CW, and where the first CW is based on rate matching the one TB using a first redundancy version (RV) and the second CW is based on rate matching the one TB using the second RV.

Aspect 25 is the first network entity of any of aspects 14 to 24, where the first RV is indicated by the DCI, and where the second RV is indicated by the DCI or configured based on an RV offset relative to the first RV, the RV offset being independent of the DCI.

Aspect 26 is the first network entity of any of aspects 14 to 25, where the at least one TB or CW includes a first TB or a first CW and a second TB or a second CW, and where at least one of the first CW or the second CW is associated with at least one first layer of the first subset of layers and at least one second layer of the second subset of layers.

Aspect 27 is a method of wireless communication for implementing any of aspects 1 to 13.

Aspect 28 is an apparatus for wireless communication including means for implementing any of aspects 1 to 13.

Aspect 29 is a computer-readable medium storing computer executable code, where the code when executed by a processor causes the processor to implement any of aspects 1 to 13.

Aspect 30 is a method of wireless communication for implementing any of aspects 14 to 26.

Aspect 31 is an apparatus for wireless communication including means for implementing any of aspects 14 to 26.

Aspect 32 is a computer-readable medium storing computer executable code, where the code when executed by a processor causes the processor to implement any of aspects 14 to 26.

What is claimed is:

1. A first network entity for wireless communication, comprising:
   memory; and
   at least one processor coupled to the memory, wherein the at least one processor is configured to:
   receive, from a second network entity, downlink control information (DCI) scheduling a physical uplink shared channel (PUSCH) transmission, wherein the PUSCH transmission comprises a first portion associated with a first subset of layers within a set of layers for transmission on a first beam based on a first set of parameters and a second portion associated with a second subset of layers within the set of layers for transmission on a second beam based on a second set of parameters;
   map at least one transport block (TB) or at least one codeword (CW) to the first portion or the second portion based on the DCI or a radio resource control (RRC) configuration, wherein the DCI or the RRC configuration indicates between:
   a first mode in which one TB or one CW is mapped to the first portion for transmission on the first beam and the second portion for transmission on the second beam, and
   a second mode in which a first TB or a first CW is mapped to the first portion for transmission on the first beam and a second TB or a second CW is mapped to the second portion for transmission on the second beam; and
   transmit the at least one TB or the at least one CW to the second network entity, wherein when the DCI or the RRC configuration indicates the first mode, the one TB or the one CW is transmitted on both the first beam and the second beam, and when the DCI or the RRC configuration indicates the second mode, the first TB or the first CW is transmitted on the first beam and the second TB or the second CW is transmitted on the second beam.

2. The first network entity of claim 1, wherein to map the at least one TB or the at least one CW to the first portion or the second portion based on the DCI or the RRC configuration, the at least one processor is configured to map the at least one TB or the at least one CW to the first portion or the second portion based on the RRC configuration, and wherein the RRC configuration is associated with a bandwidth part (BWP) or a serving cell.

3. The first network entity of claim 1, wherein to map the at least one TB or the at least one CW to the first portion or the second portion based on the DCI or the RRC configuration, the at least one processor is configured to map the at least one TB or the at least one CW to the first portion or the second portion based on the DCI.

4. The first network entity of claim 3, wherein the DCI comprises a first indication associated with a first modulation and coding scheme (MCS), a first new data indicator (NDI), or a first redundancy version (RV), wherein the first indication is associated with the first TB or the first CW associated with the first subset of layers, wherein the DCI comprises a second indication associated with a second MCS, a second NDI, or a second RV, wherein the second indication is associated with the second TB or the second CW associated with the second subset of layers.

5. The first network entity of claim 4, wherein the DCI further comprises a disable indication, wherein the disable indication is configured to cause the at least one processor to refrain from using the second MCS, the second NDI, or the second RV associated with the second indication, and wherein the at least one TB or the at least one CW correspond to the first TB or the first CW based on the disable indication.

6. The first network entity of claim 3, wherein the DCI comprises a sounding reference signal (SRS) resource set indicator, and wherein the at least one processor is configured to map the at least one TB or the at least one CW to the first portion or the second portion based on the SRS resource set indicator.

7. The first network entity of claim 6, wherein the SRS resource set indicator indicates a first SRS resource set associated with the first subset of layers and a second SRS resource set associated with the second subset of layers.

8. The first network entity of claim 3, wherein to map the at least one TB or the at least one CW to the first portion or the second portion based on the DCI or the RRC configuration, the at least one processor is configured to map the at least one TB or the at least one CW to the first portion or the second portion based on a first number of layers associated with the first subset of layers and a second number of layers associated with the second subset of layers.

9. The first network entity of claim 1, wherein to map the at least one TB or the at least one CW to the first portion or the second portion based on the DCI or the RRC configuration, the at least one processor is configured to map the at least one TB or the at least one CW to the first portion or the second portion based on a number of sounding reference signal (SRS) resource sets associated with the PUSCH transmission, and wherein the DCI comprises a first indication associated with a first modulation and coding scheme (MCS), a first new data indicator (NDI), or a first redundancy version (RV), wherein the first indication is associated with the first TB or the first CW associated with the first subset of layers, wherein the DCI comprises a second indication associated with a second MCS, a second NDI, or a second RV, wherein the second indication is associated with the second TB or the second CW associated with the second subset of layers.

10. The first network entity of claim 9, wherein the number of SRS resource sets associated with the PUSCH transmission is one, and wherein the DCI further comprises a disable indication, wherein the disable indication is configured to cause the at least one processor to refrain from using the first MCS, the first NDI, or the first RV associated with the first indication or refrain from using the second MCS, the second NDI, or the second RV associated with the second indication.

11. The first network entity of claim 1, wherein the at least one TB or the at least one CW includes the one TB, the first CW, and the second CW, and wherein the first CW is based on rate matching the one TB using a first redundancy version (RV) and the second CW is based on rate matching the one TB using the second RV.

12. The first network entity of claim 11, wherein the first RV is indicated by the DCI, and wherein the second RV is indicated by the DCI or configured based on an RV offset relative to the first RV, the RV offset being independent of the DCI.

13. The first network entity of claim 1, wherein the at least one TB or the at least one CW comprises the first TB or the first CW and the second TB or the second CW, and wherein at least one of the first CW or the second CW is associated with at least one first layer of the first subset of layers and at least one second layer of the second subset of layers.

14. A first network entity for wireless communication, comprising:
memory; and
at least one processor coupled to the memory, wherein the at least one processor is configured to:
transmit, to a second network entity, downlink control information (DCI) scheduling a physical uplink shared channel (PUSCH) transmission, wherein the PUSCH transmission comprises a first portion associated with a first subset of layers within a set of layers for reception on a first beam based on a first set of parameters and a second portion associated with a second subset of layers within the set of layers for reception on a second beam based on a second set of parameters, wherein the DCI or a radio resource control (RRC) configuration indicates between:
a first mode in which one TB or one CW is mapped to the first portion on the first beam and the second portion on the second beam, and
a second mode in which a first TB or a first CW is mapped to the first portion on the first beam and a second TB or a second CW is mapped to the second portion on the second beam; and
receive at least one transport block (TB) or at least one codeword (CW) from the second network entity, wherein the at least one TB or the at least one CW is mapped to the first portion or the second portion based on the DCI or the RRC configuration, wherein when the DCI or the RRC configuration indicates the first mode, the one TB or the one CW is received on both the first beam and the second beam, and when the DCI or the RRC configuration indicates the second mode, the first TB or the first CW is received on the first beam and the second TB or the second CW is transmitted on the second beam.

15. The first network entity of claim 14, wherein the at least one TB or the at least one CW is mapped to the first portion or the second portion based on the RRC configuration, and wherein the RRC configuration is associated with a bandwidth part (BWP) or a serving cell.

16. The first network entity of claim 14, wherein the at least one TB or the at least one CW is mapped to the first portion or the second portion based on the DCI.

17. The first network entity of claim 16, wherein the DCI comprises a first indication associated with a first modulation and coding scheme (MCS), a first new data indicator (NDI), or a first redundancy version (RV), wherein the first indication is associated with the first TB or the first CW associated with the first subset of layers, wherein the DCI comprises a second indication associated with a second MCS, a second NDI, or a second RV, wherein the second indication is associated with the second TB or the second CW associated with the second subset of layers.

18. The first network entity of claim 17, wherein the DCI further comprises a disable indication, wherein the disable indication indicates refraining from using the second MCS, the second NDI, or the second RV associated with the second indication, and wherein the at least one TB or the at least one CW correspond to the first TB or the first CW based on the disable indication.

19. The first network entity of claim 16, wherein the DCI comprises a sounding reference signal (SRS) resource set indicator, and the at least one TB or the at least one CW is mapped to the first PUSCH transmission or the second PUSCH transmission based on the SRS resource set indicator.

20. The first network entity of claim 19, wherein the SRS resource set indicator indicates a first SRS resource set associated with the first subset of layers and a second SRS resource set associated with the second subset of layers.

21. The first network entity of claim 16, wherein the at least one TB or the at least one CW is mapped to the first portion or the second portion based on a first number of layers associated with the first subset of layers and a second number of layers associated with the second subset of layers.

22. The first network entity of claim 14, wherein the at least one TB or the at least one CW is mapped to the first portion or the second portion based on a number of sounding reference signal (SRS) resource sets associated with the PUSCH transmission, and wherein the DCI comprises a first indication associated with a first modulation and coding scheme (MCS), a first new data indicator (NDI), or a first redundancy version (RV), wherein the first indication is associated with the first TB or the first CW associated with the first subset of layers, wherein the DCI comprises a second indication associated with a second MCS, a second NDI, or a second RV, wherein the second indication is associated with the second TB or the second CW associated with the second subset of layers.

23. The first network entity of claim 22, wherein the number of SRS resource sets associated with the PUSCH transmission is one, and wherein the DCI comprises a disable indication indicating refraining from using the first MCS, the first NDI, or the first RV associated with the first indication or refraining from using the second MCS, the second NDI, or the second RV associated with the second indication.

24. The first network entity of claim 14, wherein the at least one TB or the at least one CW includes one TB, the first CW, and the second CW, and wherein the first CW is based on rate matching the one TB using a first redundancy version (RV) and the second CW is based on rate matching the one TB using the second RV.

25. The first network entity of claim 24, wherein the first RV is indicated by the DCI, and wherein the second RV is indicated by the DCI or configured based on an RV offset relative to the first RV, the RV offset being independent of the DCI.

26. The first network entity of claim 14, wherein the at least one TB or the at least one CW comprises the first TB or the first CW and the second TB or the second CW, and wherein at least one of the first CW or the second CW is associated with at least one first layer of the first subset of layers and at least one second layer of the second subset of layers.

27. A method of wireless communication at a first network entity, comprising:
receiving, from a second network entity, downlink control information (DCI) scheduling a physical uplink shared channel (PUSCH) transmission, wherein the PUSCH transmission comprises a first portion associated with a first subset of layers within a set of layers for transmission on a first beam based on a first set of parameters and a second portion associated with a second subset of layers within the set of layers for transmission on a second beam based on a second set of parameters;
mapping at least one transport block (TB) or at least one codeword (CW) to the first portion or the second portion based on the DCI or a radio resource control (RRC) configuration, wherein the DCI or the RRC configuration indicates between:
a first mode in which one TB or one CW is mapped to the first portion for transmission on the first beam and the second portion for transmission on the second beam, and
a second mode in which a first TB or a first CW is mapped to the first portion for transmission on the first beam and a second TB or a second CW is mapped to the second portion for transmission on the second beam; and
transmitting the at least one TB or the at least one CW to the second network entity, wherein when the DCI or the RRC configuration indicates the first mode, the one TB or the one CW is transmitted on both the first beam and the second beam, and when the DCI or the RRC configuration indicates the second mode, the first TB or the first CW is transmitted on the first beam and the second TB or the second CW is transmitted on the second beam.

28. The method of claim 27, wherein the DCI comprises a first indication associated with a first modulation and coding scheme (MCS), a first new data indicator (NDI), or a first redundancy version (RV), wherein the first indication is associated with the first TB or the first CW associated with the first subset of layers, wherein the DCI comprises a second indication associated with a second MCS, a second NDI, or a second RV, wherein the second indication is associated with the second TB or the second CW associated with the second subset of layers.

29. The method of claim 27, wherein the at least one TB or the at least one CW includes the one TB, the first CW, and the second CW, and wherein the first CW is based on rate matching the one TB using a first redundancy version (RV) and the second CW is based on rate matching the one TB using the second RV.

30. A method of wireless communication at a first network entity, comprising:
transmitting, to a second network entity, downlink control information (DCI) scheduling a physical uplink shared channel (PUSCH) transmission, wherein the PUSCH transmission comprises a first portion associated with a first subset of layers within a set of layers for reception on a first beam based on a first set of parameters and a second portion associated with a second subset of layers within the set of layers for reception on a second beam based on a second set of parameters, wherein the DCI or a radio resource control (RRC) configuration indicates between:
a first mode in which one TB or one CW is mapped to the first portion on the first beam and the second portion on the second beam, and
a second mode in which a first TB or a first CW is mapped to the first portion on the first beam and a second TB or a second CW is mapped to the second portion on the second beam; and
receiving at least one transport block (TB) or at least one codeword (CW) from the second network entity, wherein the at least one TB or the at least one CW is mapped to the first portion or the second portion based on the DCI or the RRC configuration, wherein when the DCI or the RRC configuration indicates the first mode, the one TB or the one CW is received on both the first beam and the second beam, and when the DCI or the RRC configuration indicates the second mode, the first TB or the first CW is received on the first beam and the second TB or the second CW is transmitted on the second beam.

\* \* \* \* \*